(12) United States Patent
Summerville et al.

(10) Patent No.: US 10,540,669 B2
(45) Date of Patent: Jan. 21, 2020

(54) MANAGING OBJECT VALUES AND RESOURCE CONSUMPTION

(71) Applicant: SAS Institute Inc., Cary, NC (US)

(72) Inventors: Natalia Summerville, Cary, NC (US); Ivan Borges Oliveira, Raleigh, NC (US); Scott Shuler, Cary, NC (US); Golbarg Tutunchi, Raleigh, NC (US); Fang Liang, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/425,341

(22) Filed: May 29, 2019

(65) Prior Publication Data

US 2019/0370836 A1    Dec. 5, 2019

Related U.S. Application Data

(60) Provisional application No. 62/677,722, filed on May 30, 2018, provisional application No. 62/749,292, filed on Oct. 23, 2018.

(51) Int. Cl.
*G06F 7/00* (2006.01)
*G06Q 30/02* (2012.01)

(52) U.S. Cl.
CPC ................ *G06Q 30/0206* (2013.01)

(58) Field of Classification Search
CPC .... G06F 16/1748; G06F 16/254; G06F 16/38; G06F 16/2462; G06F 16/285
See application file for complete search history.

(56) References Cited

U.S. PATENT DOCUMENTS

| | | | |
|---|---|---|---|
| 7,630,986 B1 * | 12/2009 | Herz | ............ G06Q 10/10 |
| 7,693,877 B1 | 4/2010 | Zasman | |
| 7,730,063 B2 * | 6/2010 | Eder | ............ G06N 5/022 |
| | | | 707/736 |

(Continued)

OTHER PUBLICATIONS

"IBM Engineering Lifecycle Optimization—Engineering Insights", Available on Internet at https://www.ibm.com/us-en/marketplace/engineering-insights, Accessed from Internet on May 27, 2019, 7 pages.

(Continued)

*Primary Examiner* — Daniel A Kuddus
(74) *Attorney, Agent, or Firm* — Kilpatrick Townsend & Stockton LLP

(57) ABSTRACT

Managing the amount of computing resources required to execute a process for determining values of a parameter associated with an object over a lifetime of the object is disclosed here. In one example, a data structure is generated. The data structure including candidate values for the parameter that comply with constraints assigned to multiple dates occurring during the lifetime of the object. The data structure is pruned by aggregating actionable periods. A first combination of candidate values associated with the aggregated actionable periods is determined that results in the minimum amount of the object being provided to the users during the lifetime. A second combination of candidate values associated with the aggregated actionable periods is determined that satisfies a return objective. The second combination of values are usable by a remote computing device to implement a value schedule for the object.

27 Claims, 16 Drawing Sheets

(56) References Cited

U.S. PATENT DOCUMENTS

| | | | |
|---|---|---|---|
| 7,788,119 | B2 | 8/2010 | Najmi et al. |
| 7,996,331 | B1* | 8/2011 | Solanki .................. G06Q 10/04 |
| | | | 705/1.1 |
| 8,000,996 | B1 | 8/2011 | Sanli et al. |
| 8,160,917 | B1* | 4/2012 | Solanki .............. G06Q 10/0637 |
| | | | 705/7.31 |
| 8,301,485 | B2 | 10/2012 | Ford et al. |
| 8,443,355 | B2 | 5/2013 | Wiese et al. |
| 8,713,025 | B2* | 4/2014 | Eder ..................... G06F 16/951 |
| | | | 707/741 |
| 8,782,009 | B2 | 7/2014 | Shaath et al. |
| 9,652,366 | B2 | 5/2017 | Sivanesan et al. |
| 10,210,175 | B2 | 2/2019 | Guo et al. |
| 2007/0088584 | A1 | 4/2007 | Aragones et al. |
| 2008/0127089 | A1 | 5/2008 | Peretz et al. |
| 2008/0270202 | A1 | 10/2008 | Krempel et al. |
| 2010/0049538 | A1* | 2/2010 | Frazer ................... G06Q 30/02 |
| | | | 705/14.4 |
| 2010/0250329 | A1* | 9/2010 | Sanli ...................... G06Q 10/04 |
| | | | 705/4 |
| 2014/0278755 | A1* | 9/2014 | Eberl ................ G06F 16/24578 |
| | | | 707/609 |
| 2014/0330747 | A1* | 11/2014 | Candas .................. G06Q 40/06 |
| | | | 705/36 R |
| 2015/0379429 | A1* | 12/2015 | Lee .......................... G09B 5/00 |
| | | | 706/11 |
| 2016/0225575 | A1* | 8/2016 | Muto ....................... H01J 37/08 |
| 2016/0335575 | A1* | 11/2016 | Suntinger .............. G06Q 10/04 |
| 2017/0006135 | A1* | 1/2017 | Siebel ...................... H04L 67/02 |

OTHER PUBLICATIONS

"Nokia Asset Lifecycle Optimization", Available on Internet at https://spacetimeinsight.com/asset-lifecycle-optimization/, Accessed from Internet on May 27, 2019, 5 pages.

"Product Lifecycle Optimization", AIMMS, Available on Internet at https://aimms.com/english/software-solutions/solutions/product-lifecycle-optimization/, Accessed from Internet on May 27, 2019, 3 pages.

"The Lifecycle of Website Optimization [Infographic and Guide]", Crazyegg, Available on Internet at https://www.crazyegg.com/blog/the-lifecycle-of-website-optimization-infographic-and-guide/, Accessed from Internet on May 27, 2019, 19 pages.

Antoine et al., "Lifecycle Optimization for Power Plants", Availabe on Internet at https://pdfs.semanticscholar.org/7b96/a5b0d4a16eaeb79dc6d0085240301dec344f.pdf, 15 pages.

Sankar, "Hardware Analytics and Lifecycle Optimization (HALO) at Facebook", Available on Internet at https://code.fb.com/data-center-engineering/hardware-analytics-and-lifecycle-optimization-halo-at-facebook/, Mar. 21, 2017, 5 pages.

* cited by examiner

| Aggregated Object | Web Page | Candidate Values (Quality) | Aggregated Actionable Periods | Forecasted Demand |
|---|---|---|---|---|
| Visual Content #1 | Page 1 | UHD, HD | 4/1-4/5 | 10,000 |
| Visual Content #1 | Page 1 | UHD, HD, SD | 5/15-5/22 | 15,000 |
| Visual Content #1 | Page 1 | HD, SD | 6/1-6/3 | 20,000 |
| Visual Content #1 | Page 2 | HD, SD | 4/1-4/5 | 18,000 |
| Visual Content #2 | Page 2 | UHD, SD | 4/19-5/1 | 30,000 |
| ... | ... | ... | ... | ... |

FIG. 15

| Object (Group) | Web Page | Quality | Date |
|---|---|---|---|
| Animation Kids Only | Page 1 | HD | 4/1-5/25 |
| Animation Kids Only | Page 1 | UHD, HD, SD | 5/26-6/30 |
| Animation Kids Only | Page 1 | UHD, HD | 7/1-8/31 |
| Drama | Page 3 | UHD | 4/1-6/30 |
| ... | ... | ... | ... |
| Action | Page 2 | UHD, HD | 4/1-7/31 |
| ... | ... | ... | ... |
| Si-Fi | Page 4 | UHD, HD | 4/1-5/25 |
| ... | ... | ... | ... |

FIG. 17

MANAGING OBJECT VALUES AND RESOURCE CONSUMPTION

REFERENCE TO RELATED APPLICATION

This application claims the benefit of priority under 35 U.S.C. § 119(e) to U.S. Provisional Patent Application No. 62/677,722, filed May 30, 2018, and to U.S. Provisional Patent Application No. 62/749,292, filed Oct. 23, 2018, the entirety of each of which is hereby incorporated by reference herein.

TECHNICAL FIELD

The present disclosure relates generally to managing computing resources and other resources. More specifically, but not by way of limitation, this disclosure relates to managing computing resources or other resources over a lifetime of the object.

BACKGROUND

Objects typically have a lifetime. For example, an object's lifetime might include an incline period when the object is first made available in a distributed network and the object's demand gradually increases. This may be followed by a decline period when the object's demand gradually decreases. The value of the object impacts the number of users who can access the object. In order for as many users as possible to access the object, the value associated with the object is often changed at different points during its lifetime.

SUMMARY

One example of the present disclosure includes a system. The system can include a processing device and a memory device comprising instructions that are executable by the processing device. The instructions can cause the processing device to receive input data comprising a plurality of constraints that bound potential values for a parameter associated with an object over a future timespan, and a minimum amount of the object to be provided to users during the future timespan. The instructions can cause the processing device to generate a data structure based on the plurality of constraints, the data structure comprising candidate values for the parameter that comply with the plurality of constraints assigned to a plurality of dates occurring during the future timespan. The instructions can cause the processing device to determine a plurality of actionable periods occurring within the future timespan, the plurality of actionable periods being time periods during which a value of the parameter is set to one of the candidate values in the data structure to comply with the plurality of constraints. The instructions can cause the processing device to generate aggregated actionable periods by combining together pairs of actionable periods from among the plurality of actionable periods that span adjacent date ranges in the future timespan. The instructions can cause the processing device to determine if a first combination of candidate values associated with the aggregated actionable periods results in the minimum amount of the object being provided to the users during the future timespan, the first combination of candidate values comprising a first subset of the candidate values having lowest magnitudes during the aggregated actionable periods. The instructions can cause the processing device to, in response to determining that the first combination of candidate values results in the minimum amount of the object being provided to the users during the future timespan, determine a second combination of candidate values associated with the aggregated actionable periods, wherein the second combination of candidate values satisfies a return objective and comprises a second subset of the candidate values with higher magnitudes than the first combination of candidate values. The instructions can cause the processing device to cause the second combination of candidate values to be transmitted to a remote computing device, wherein the second combination of values are usable by the remote computing device to implement a value schedule for the object.

Another example of the present disclosure includes a non-transitory computer readable medium comprising instructions that are executable by a processing device. The instructions can cause the processing device to receive input data comprising (i) a plurality of constraints that bound potential values for a parameter associated with an object over a future timespan, and (ii) a minimum amount of the object to be provided to users during the future timespan. The instructions can cause the processing device to generate a data structure based on the plurality of constraints, the data structure comprising candidate values for the parameter that comply with the plurality of constraints assigned to a plurality of dates occurring during the future timespan. The instructions can cause the processing device to determine a plurality of actionable periods occurring within the future timespan, the plurality of actionable periods being time periods during which a value of the parameter is set to one of the candidate values in the data structure to comply with the plurality of constraints. The instructions can cause the processing device to generate aggregated actionable periods by combining together pairs of actionable periods from among the plurality of actionable periods that span adjacent date ranges in the future timespan. The instructions can cause the processing device to determine if a first combination of candidate values associated with the aggregated actionable periods results in the minimum amount of the object being provided to the users during the future timespan, the first combination of candidate values comprising a first subset of the candidate values having lowest magnitudes during the aggregated actionable periods. The instructions can cause the processing device to in response to determining that the first combination of candidate values results in the minimum amount of the object being provided to the users during the future timespan, determine a second combination of candidate values associated with the aggregated actionable periods, wherein the second combination of candidate values satisfies a return objective and comprises a second subset of the candidate values with higher magnitudes than the first combination of candidate values. The instructions can cause the processing device to cause the second combination of candidate values to be transmitted to a remote computing device, wherein the second combination of values are usable by the remote computing device to implement a value schedule for the object.

Yet another example of the present disclosure includes a method. The method includes receiving input data comprising (i) a plurality of constraints that bound potential values for a parameter associated with an object over a future timespan, and (ii) a minimum amount of the object to be provided to users during the future timespan. The method includes generating a data structure based on the plurality of constraints, the data structure comprising candidate values for the parameter that comply with the plurality of constraints assigned to a plurality of dates occurring during the future timespan. The method includes determining a plurality of actionable periods occurring within the future timespan, the plurality of actionable periods being time periods during which a value of the parameter is set to one of the candidate values in the data structure to comply with the plurality of constraints. The method includes generating aggregated actionable periods by combining together pairs of actionable periods from among the plurality of actionable periods that span adjacent date ranges in the future timespan. The method includes determining if a first combination of candidate values associated with the aggregated actionable periods results in the minimum amount of the object being provided to the users during the future timespan, the first combination of candidate values comprising a first subset of the candidate values having lowest magnitudes during the aggregated actionable periods. The method includes, in response to determining that the first combination of candidate values results in the minimum amount of the object being provided to the users during the future timespan, determining a second combination of candidate values associated with the aggregated actionable periods, wherein the second combination of candidate values satisfies a return objective and comprises a second subset of the candidate values with higher magnitudes than the first combination of candidate values. The method includes causing the second combination of candidate values to be transmitted to a remote computing device, wherein the second combination of values are usable by the remote computing device to implement a value schedule for the object.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 15 is an example of pruned candidate values for a parameter associated with an object according to some aspects.

FIG. 17 is an example of values for a parameter associated with objects at different time points during the objects' lifetime according to some aspects.

Figure 1:
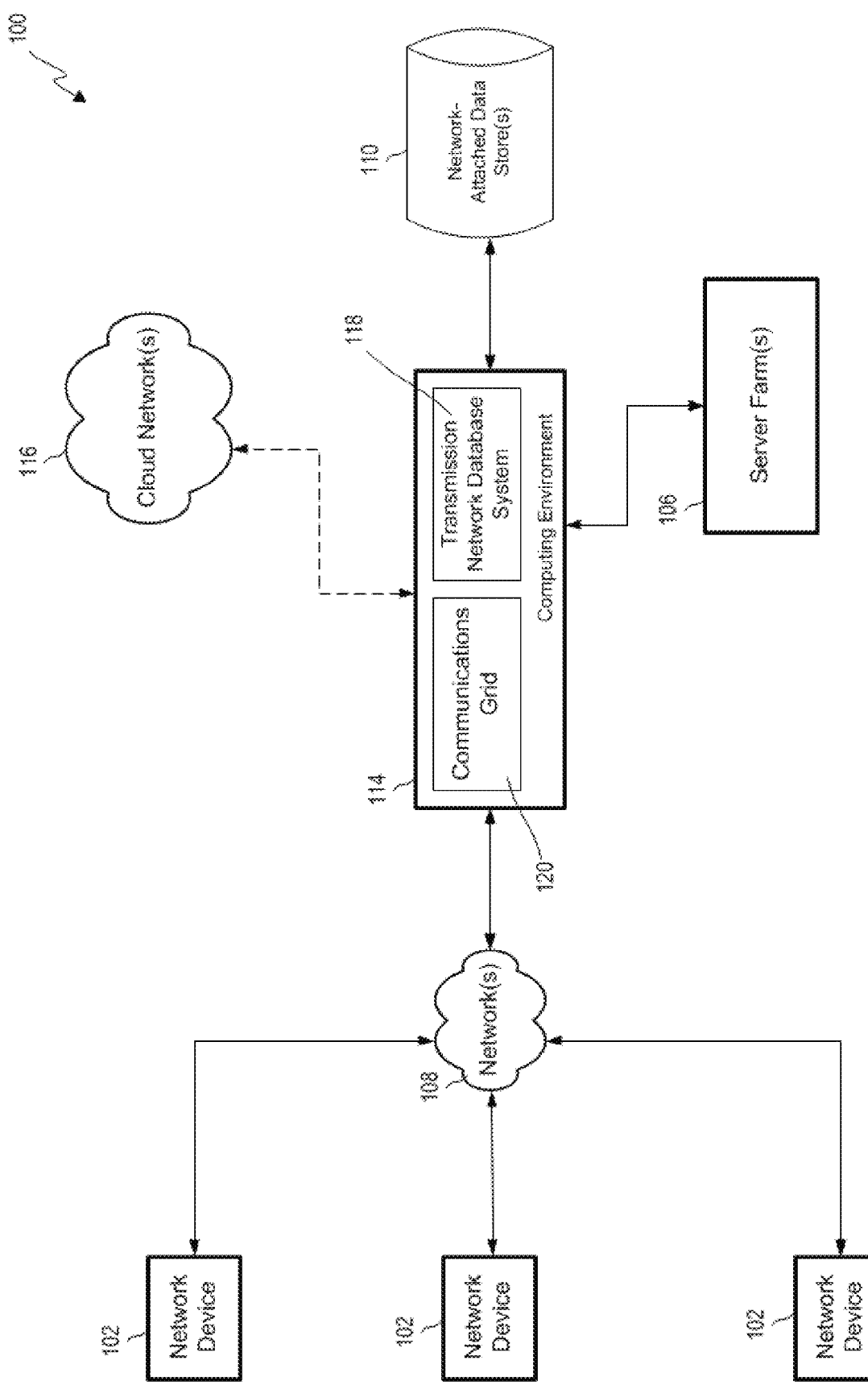
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to managing the amount of computing resources (e.g., processing power, memory, disk space, etc.) required to execute a process for determining values of a parameter associated with an object over a lifetime of the object. More specifically, the lifetime of an object includes multiple periods, and it may be desirable to determine how values of the parameter should be adjusted during the periods to satisfy various objectives. But typical processes for doing so yield sub-optimal results and are computationally expensive, requiring large amounts of computing resources. Some examples of the present disclosure can overcome one or more of these issues by reducing the amount of computing resources required to determine values for an object's parameter by significantly reducing the amount of candidate values for the parameter over the periods in the object's lifetime and minimizing the complexity of the calculations required, thereby requiring fewer computing resources to complete.

As a particular example, a processing device can receive input data that specifies constraints. The input data can be provided by a user. The constraints can bound the potential values of a parameter associated with an object over its lifetime. Based on the constraints, the processing device can generate a data structure (e.g., a value grid) that includes candidate values for the parameter associated with the object, where the candidate values comply with the constraints and are assigned to the various periods of time in the lifetime. This can significantly reduce the total number of possible values for the parameter during the lifetime of the object. Next, the processing device can determine actionable periods within the lifetime of the object. An actionable period is a time period during which the value of the parameter is settable to one of the candidate values in the data structure. The processing device generates aggregated actionable periods by combining together actionable periods that span adjacent date ranges in the lifetime. The processing device can then employ a two-stage method to holistically determine optimal values for the parameter over the lifetime, based on candidate values in the data structure and the aggregated actionable periods. This may yield more accurate results than other approaches, such as by separately determining the optimal values for the parameter during each separate period during the lifetime of the object.

In some examples, the two-stage method can involve a first stage, during which the processing device determines a first combination of candidate values for the parameter during the aggregated actionable periods. The first combination of candidate values can be a subset of the candidate values having the lowest magnitudes during the aggregated actionable periods. The processing device can determine if this combination of candidate values results in a minimum amount of the object being provided to the users during the lifetime, where the minimum amount of the object is also specified in the input data. If so, the processing device can implement a second stage of the two-stage method, during which the processing device determines a second combination of candidate values during the aggregated actionable periods. The second combination of candidate values can have higher magnitudes than the first combination of candidate values and satisfy one or more objectives associated with the object.

After determining the second combination of candidate values, the processing device can cause the second combination of candidate values of the parameter to be transmitted to a remote computing device. The remote computing device can use the second combination of candidate values of the parameter to perform various computing operations. For example, the remote computing device can implement a value schedule for the object by dynamically adjusting the parameter's value over the lifetime of the object in accordance with the value schedule.

Some examples of the present disclosure reduce the consumption of computing resources used to execute a process for determining value of a parameter associated with an object over its lifetime. For example, the above operations (e.g., reducing the candidate values of the parameters, aggregating actionable periods) result in reduced requirements for computing resources (e.g., processing power, memory, disk space, etc.) as compared to other approaches. In addition, because the determination is made jointly over the multiple time points of the lifetime, the values of the parameter obtained using the techniques described in the present disclosure provide an improvement on the objectives associated with the objects and leads to more accurate results than other approaches.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for determining values of a parameter associated with an object over a lifetime of the object according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in determining values of a parameter associated with an object over a lifetime of the object, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for determining values of a parameter associated with an object over a lifetime of the object to a network-attached data store 110 for storage. The computing environment 114 may later retrieve the data from the network-attached data store 110 and use the data to determine values of a parameter associated with an object over a lifetime of the object.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for determining values of a parameter associated with an object over a lifetime of the object.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for determining values of a parameter associated with an object over a lifetime of the object. For example, the computing environment 114, a network device 102, or both can implement one or more versions of the processes discussed with respect to any of the figures.

Figure 2:
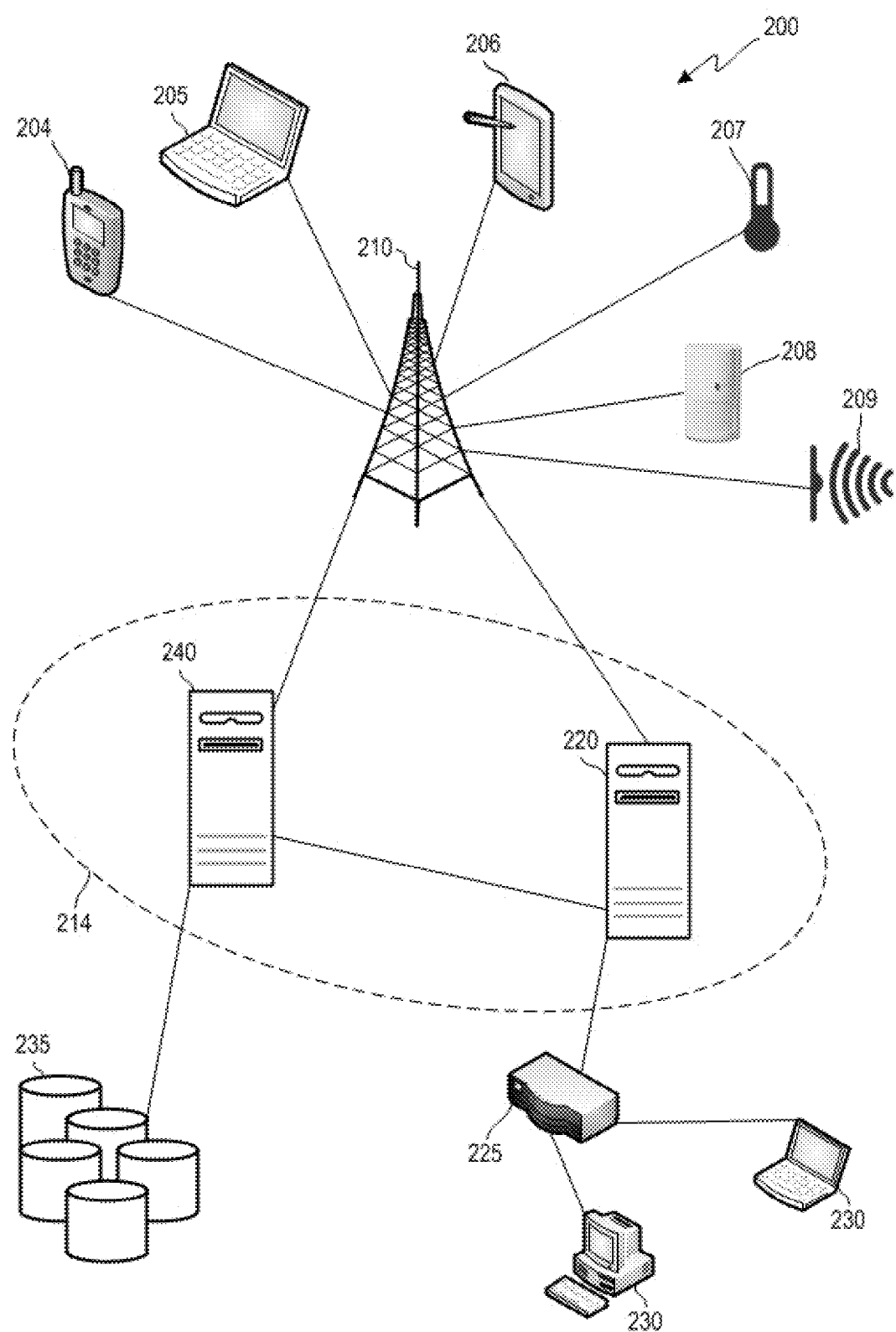
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to determine values of a parameter associated with an object over a lifetime of the object).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which values of a parameter associated with an object over a lifetime of the object are determined from data, the computing environment 214 can perform a pre-analysis of the data. The pre-analysis can include determining whether the data is in a correct format for determining values of a parameter associated with an object over a lifetime of the object using the data and, if not, reformatting the data into the correct format.

Figure 3:
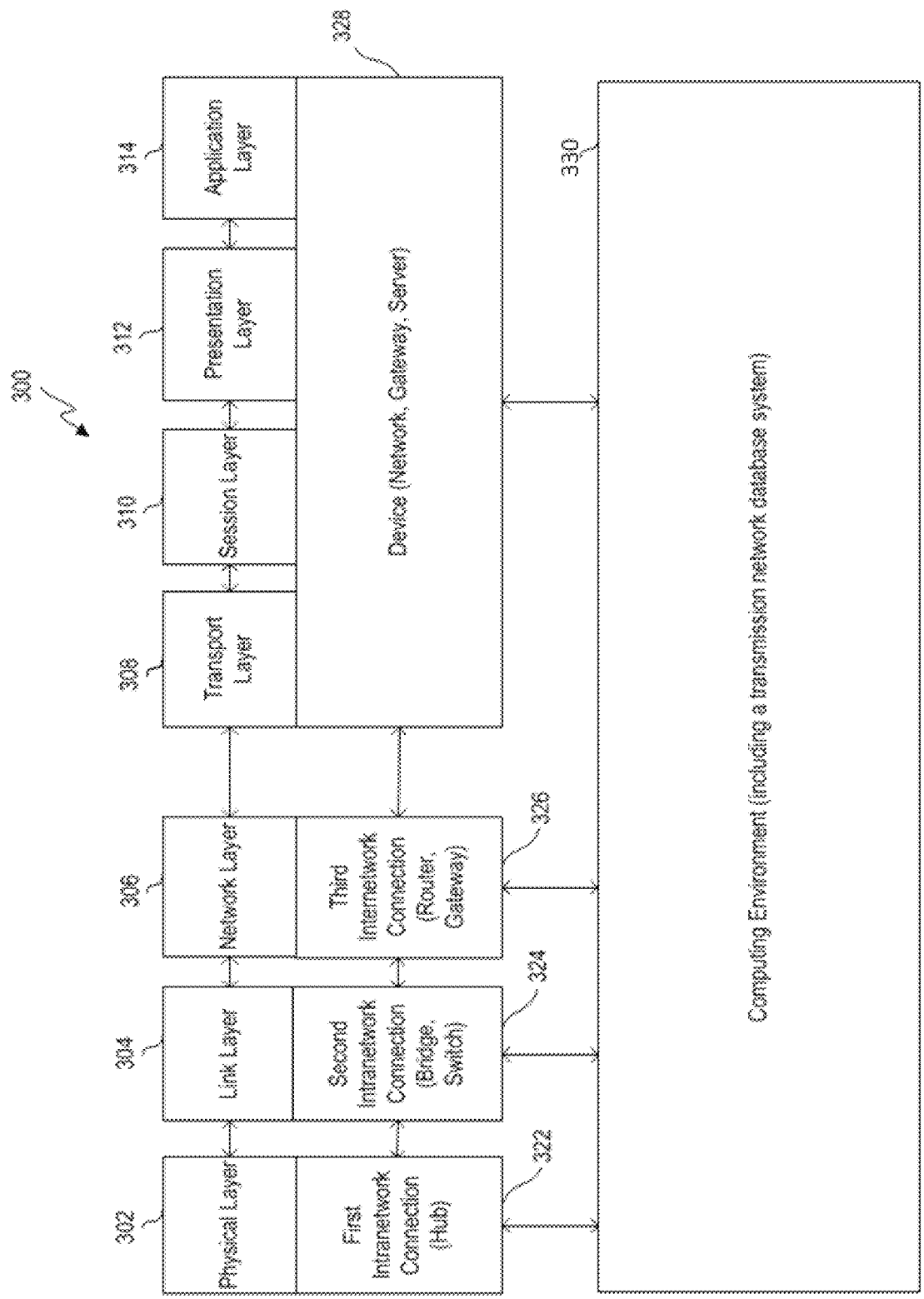
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for determining values of a parameter associated with an object over a lifetime of the object, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for determining values of a parameter associated with an object over a lifetime of the object.

Figure 4:
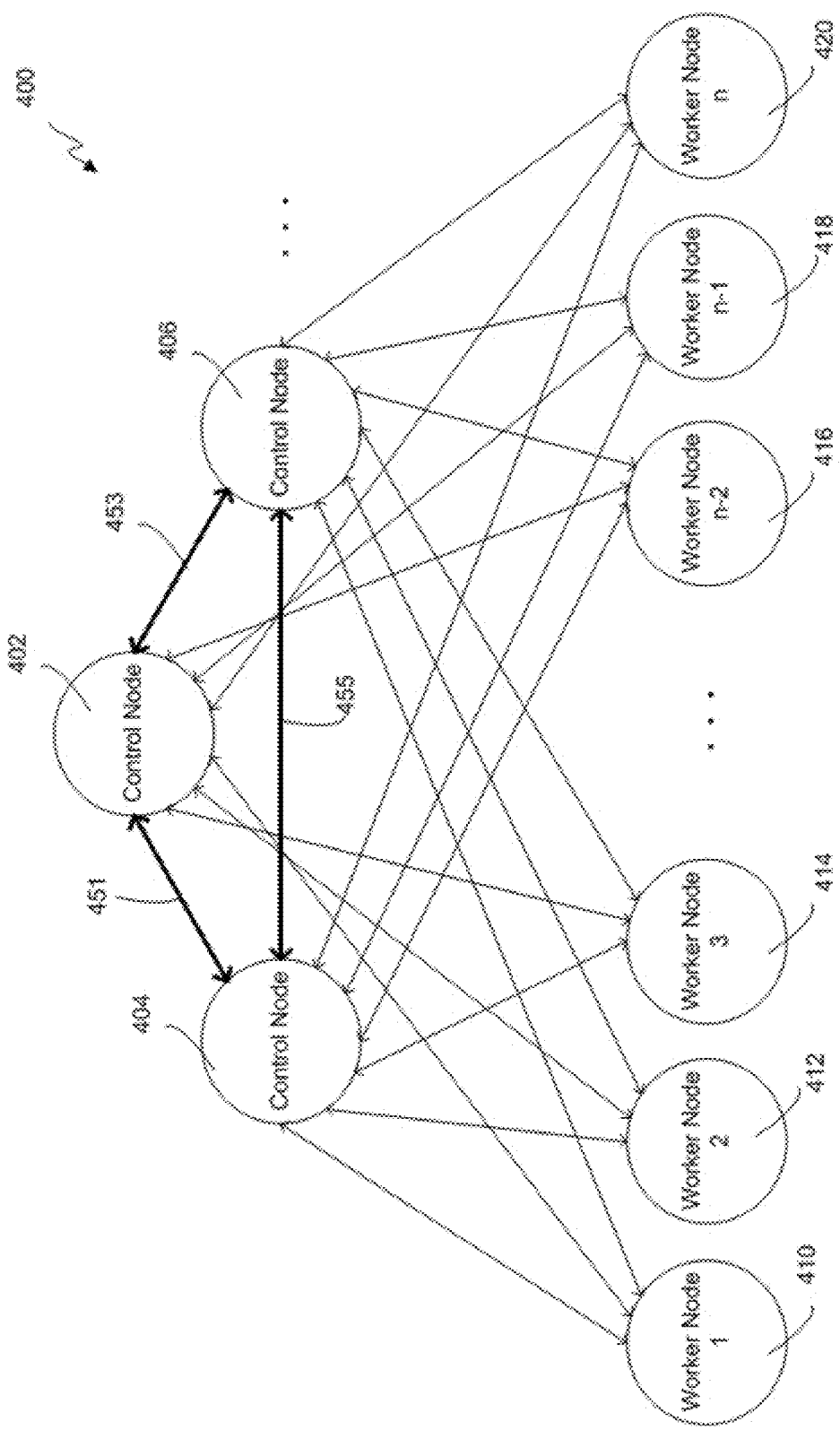
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to determining values of a parameter associated with an object over a lifetime of the object. The project may include the data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for determining values of a parameter associated with an object over a lifetime of the object can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may determine values of a parameter associated with an object over a lifetime of the object using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to determine values of a parameter associated with an object over a lifetime of the object.

Figure 5:
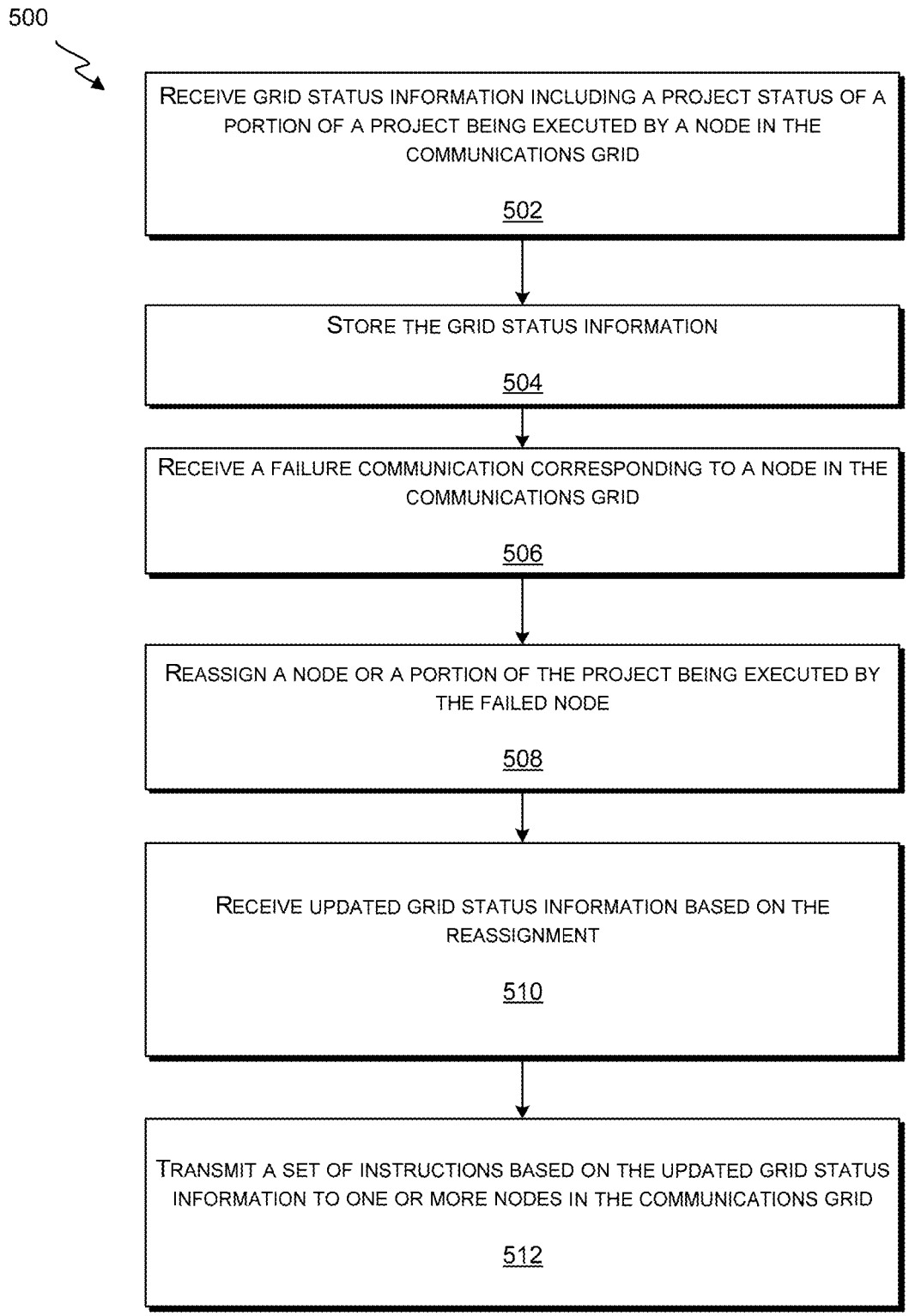
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
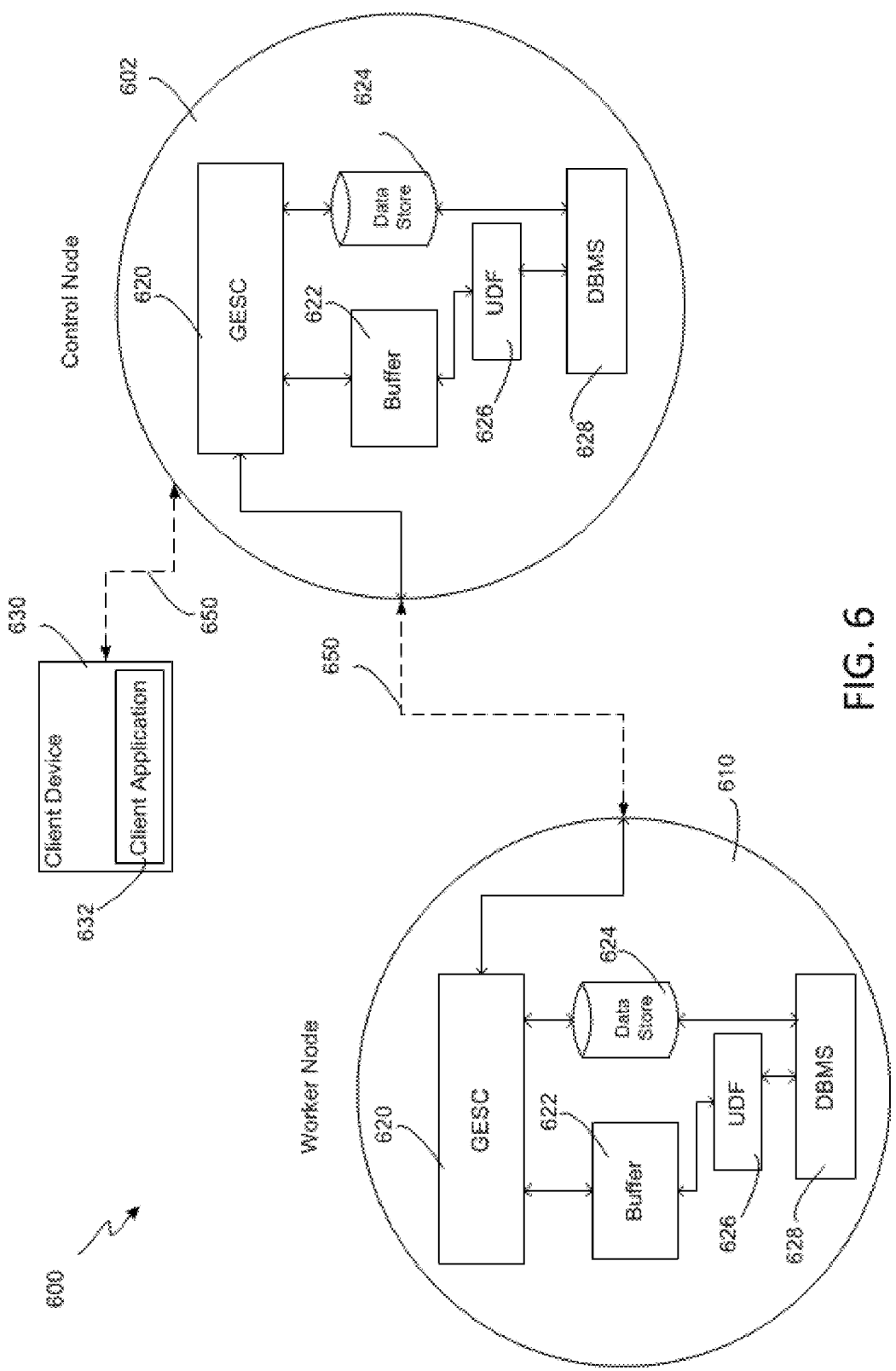
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
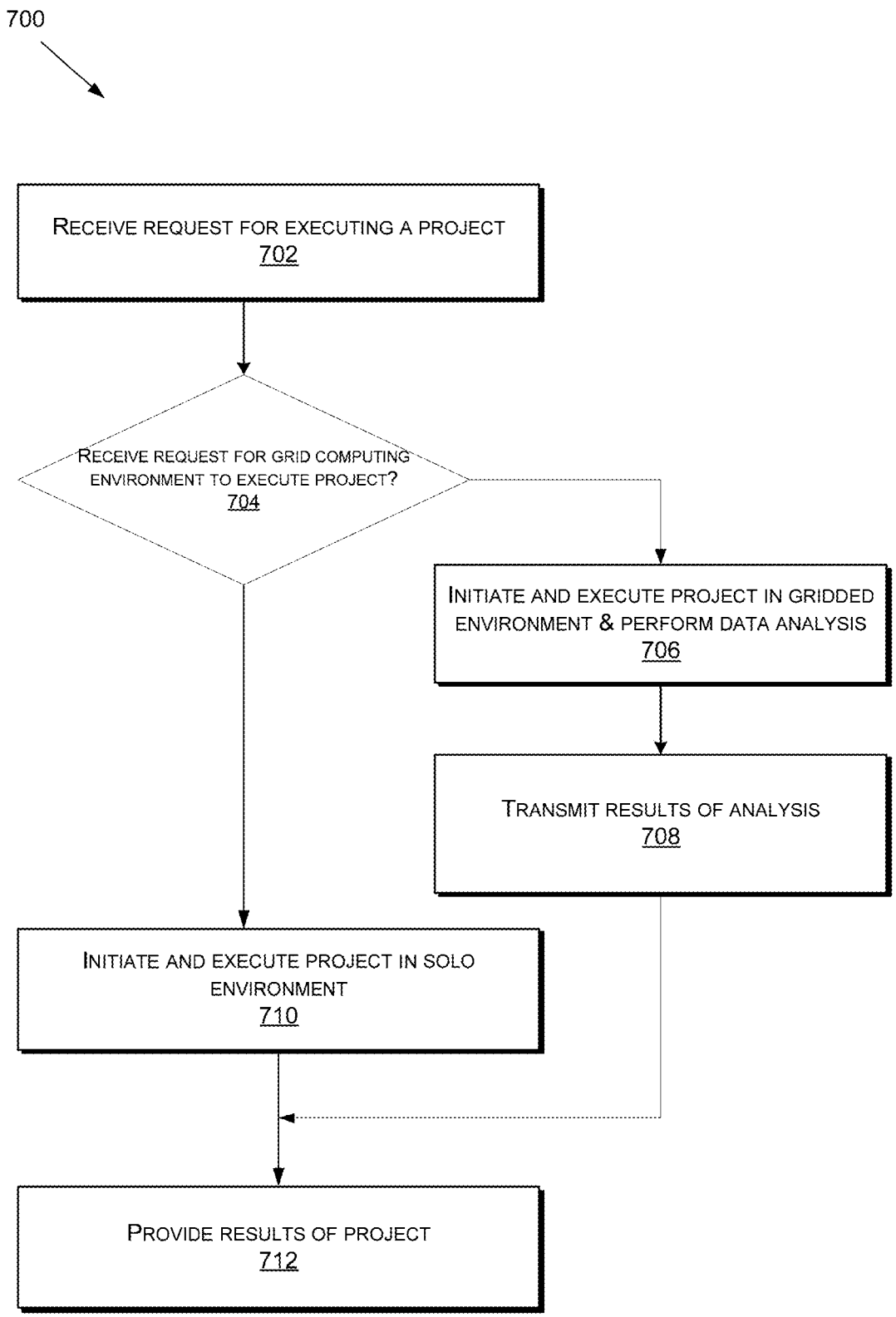
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
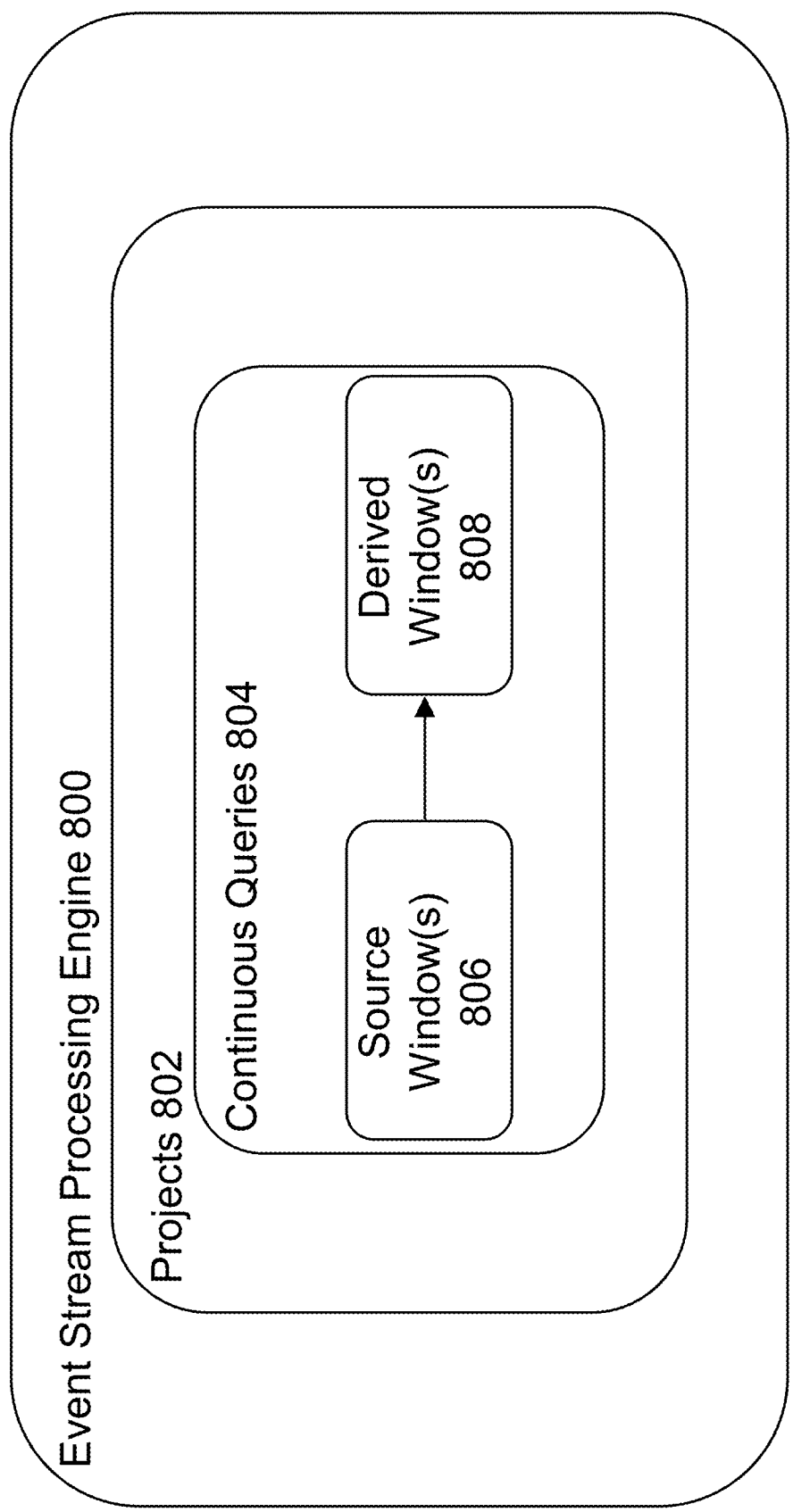
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
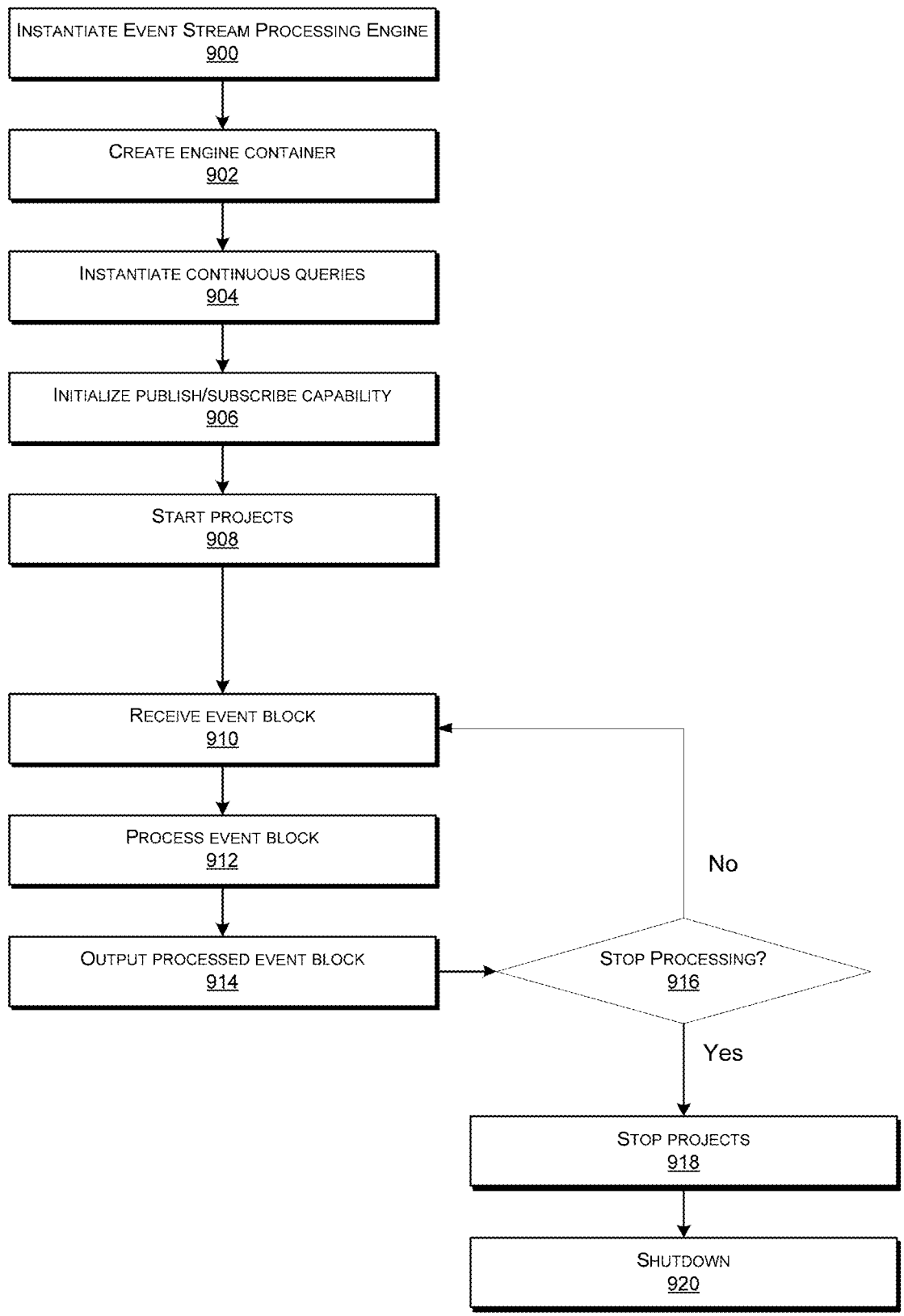
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
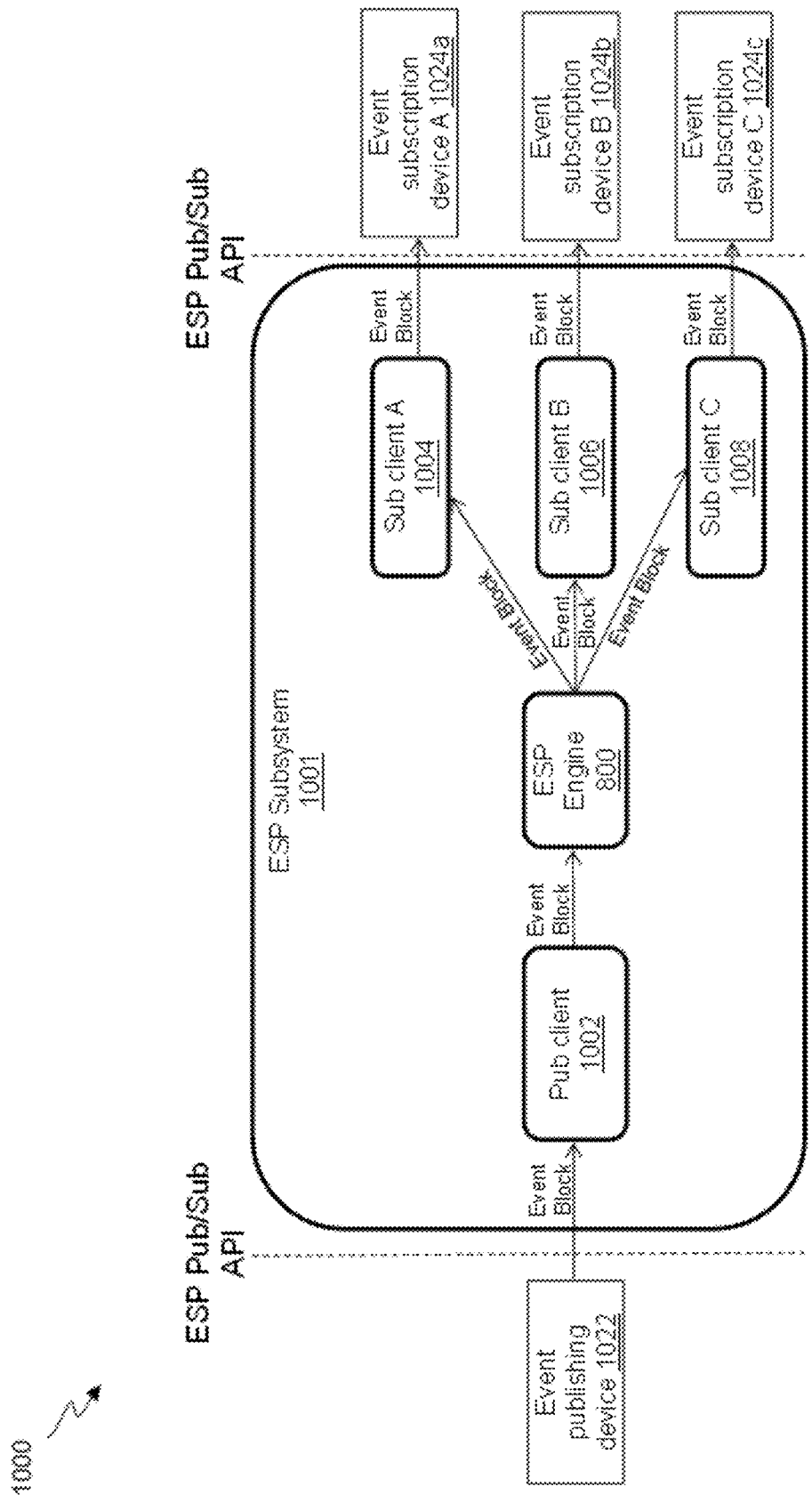
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
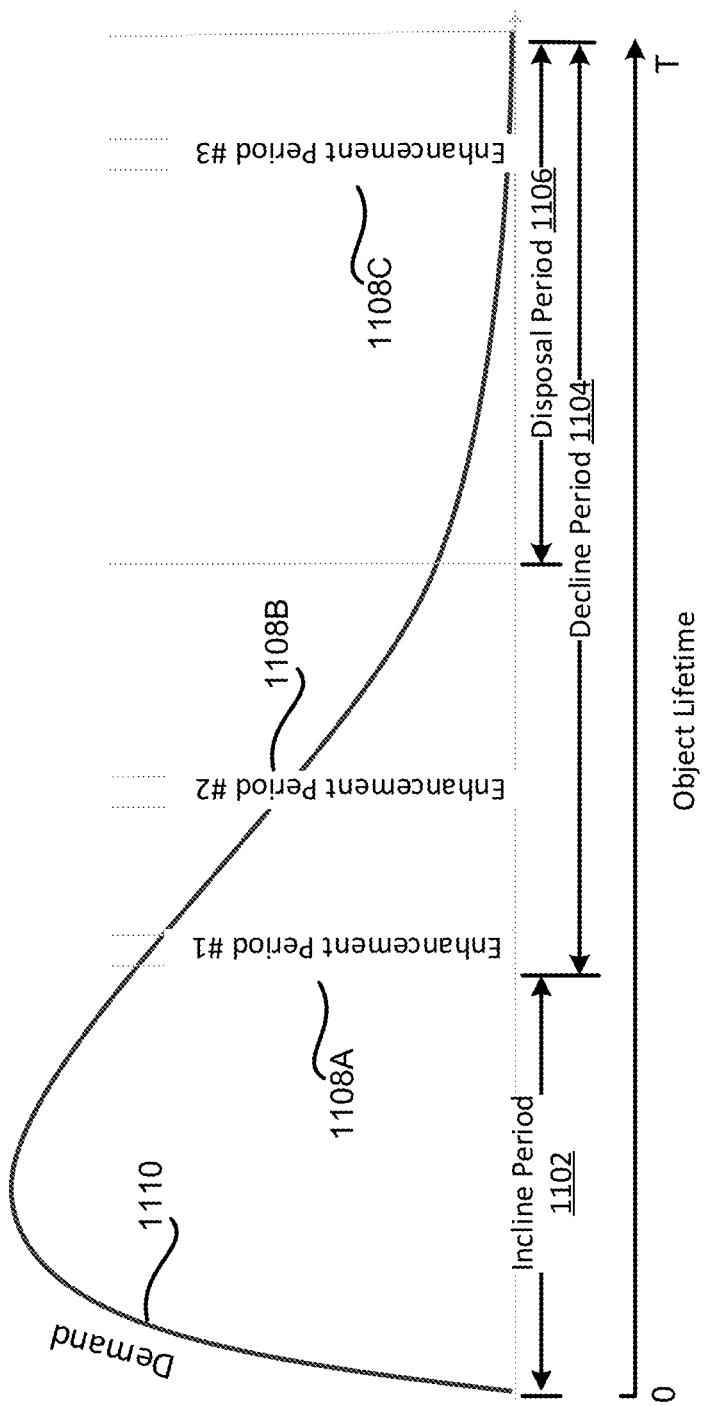
FIG. 11 is an example of the demand for an object at various points in its lifetime according to some aspects.

FIG. 11 is an example of the demand for an object at various points during its lifetime according to some aspects. In this example, the demand of the object reflects the number of copies of the object being distributed per unit time period, such as per hour, per day or per week. Tthe object may contain digital content, such as a movie, a music clip, or a digital book; a physical object, such as an electronic device; or any combination of these.

In the example shown in FIG. 11, the lifetime of an object includes an incline period 1102 when the object is first made available and the demand starts to increase. The lifetime of the object also includes a decline period 1104 when the demand for the object gradually decreases (e.g., until the object is replaced by other newer objects or is discontinued). During the incline period, more and more users become aware of the object and thus more and more users access the object until the demand of the object reaches the highest value and starts to decrease. During the decline period 1104, the demand of the object continues to decrease until it reaches zero.

In order to increase access to the object, one or more enhancement periods 1108A-1108C (which may be referred to herein individually as an enhancement period 1108 or collectively as the enhancement periods 1108) can be introduced during the incline period 1102, the decline period 1104, or both. Likewise, a disposal period 1106 can also be introduced into the decline period 1104 in order to increase access to the object. During an enhancement periods 1108 or the disposal period 1106, the value of a parameter associated with the object can be adjusted (e.g., changed). For example, the value of the parameter can be adjusted so that the amount of resources required to access a copy of the object is lowered as compared to the value of the parameter before the adjustment. In that case, users are more likely to access a copy of the object.

As one specific example, the object can include digital visual content, such as a digital movie. The parameter associated with the object can be the quality of the visual content, which can be adjustable between a high-quality version (e.g., a high-definition version) of the visual content and a low-quality version (e.g., a low-definition version) of the visual content. In this example, the high-quality version is offered by default during regular periods—i.e., periods that lack enhancement periods 1108 or disposal periods 1106. But it may require a lot of computing resources (e.g., bandwidth and memory) for users to consume the high-quality version of the visual content, which may be off-putting for many users. So, to encourage more users to access a copy of the digital visual content, the low-quality version may be made available during one or more enhancement periods 1108 or the disposal period 1106. As a result, additional users whose network bandwidth or computer settings do not support the high-quality version of the visual content may now be capable of acquiring a copy of the visual content (e.g., by streaming or downloading the lower-quality version of the visual content).

While offering both high- and low-quality versions of the digital visual content may be beneficial for increasing user access, in may result in the consumption of additional resources on the content provider's side. For example, the content provider may have to consume significant amounts of computing resources to generate the additional versions of the digital visual content and/or store the additional versions. To avoid overtaxing the content provider or to meet other objectives, constraints may also be imposed when adjusting the parameter for the object during the enhancement period 1108 or the disposal period 1106. For instance, a constraint may be imposed to specify that the parameter associated with the object, e.g. the quality of the digital visual content, cannot be lower than a certain value.

In addition, the number of the enhancement periods 1108, the duration of each enhancement period 1108, and the time when each of the enhancement periods 1108 are introduced and when the disposal period 1106 starts can also be adjusted to increase user access to the object. Some or all of these characteristics of the enhancement periods 1108 and the disposal period 1106 may be supplied as user input.

Figure 12:
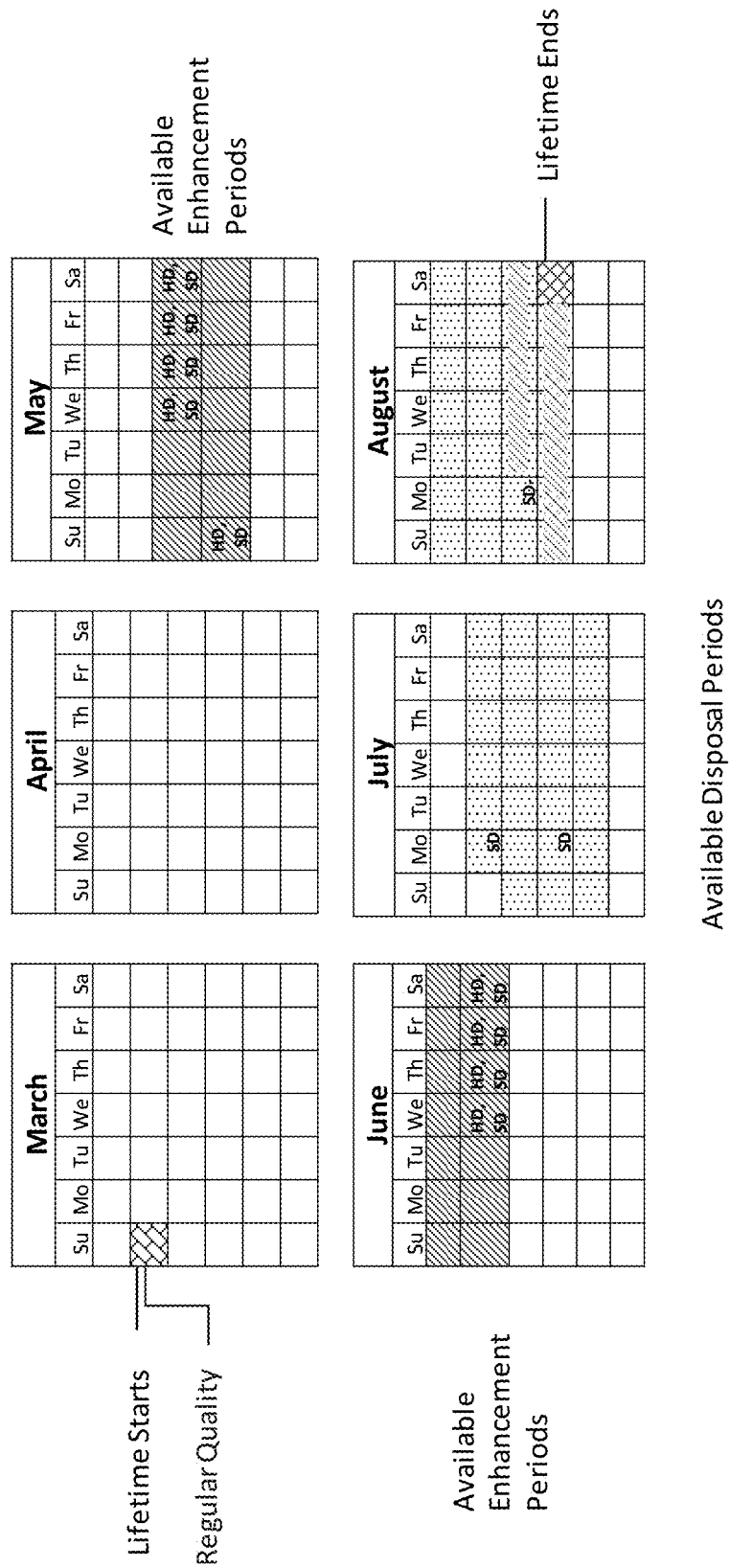
FIG. 12 is an example of the various periods associated with lifetime of an object according to some aspects.

FIG. 12 shows an example of the various periods during a lifetime of an object and the available time periods during which one or more enhancement periods 1108 and/or disposal periods 1106 can occur, according to some aspects. In this example, the lifetime of an object starts on the first Sunday of March and ends on the fourth Saturday of August. During this lifetime, the disposal period 1106 can start on any day from the second Monday of July until the end of the lifetime. Enhancement periods 1108 can be introduced during the middle two weeks of May and the beginning two weeks of June. Enhancement periods 1108 may also be introduced during the disposal period 1106, such as the last two weeks of the lifetime. The allowed candidate values for a parameter associated with the object (e.g., the quality of the digital visual content in the example of FIG. 11) are also depicted on certain days within the enhancement periods 1108 and the disposal period 1106.

In some scenarios, the location of the object also impacts user access to the object. In the above example where the object is a digital visual content, the web page where the information of the visual content is presented and a copy of the visual content can be downloaded or streamed determines whether the visual content can be easily found by users who are interested in this visual content and thus impacts the number of copies of the visual content accessed by users. For example, if a visual content suitable for kids is presented in a web page where thrillers are presented, this visual content is less likely to be discovered by kids or parents and thus will be accessed by fewer users had it be listed in a web page dedicated for kid visual content.

The location of the object may additionally or alternatively include a physical location associated with the object, such as the server storing the visual content or the server handling the streaming or downloading of the visual content. The physical location of the object can influence user access to the object, such as in circumstances where the server's location influences the streaming or download speed of the visual content. In some scenarios, an object may be presented, displayed, or otherwise accessible at more than one location. For example, a visual content may be associated with more than one category and thus be presented in more than one web page. Similarly, a copy of the same visual content may be hosted by multiple servers at different locations for user access. In scenarios where the total number of copies of an object is fixed, some copies may be hosted in one location whereas other copies are hosted in other locations. So, some examples of the present disclosure can involve determining the number of locations and the number of copies of the object in each location to satisfy various objectives, such as to maximize the total number of copies of the object accessed by users over its lifetime.

Figure 13:
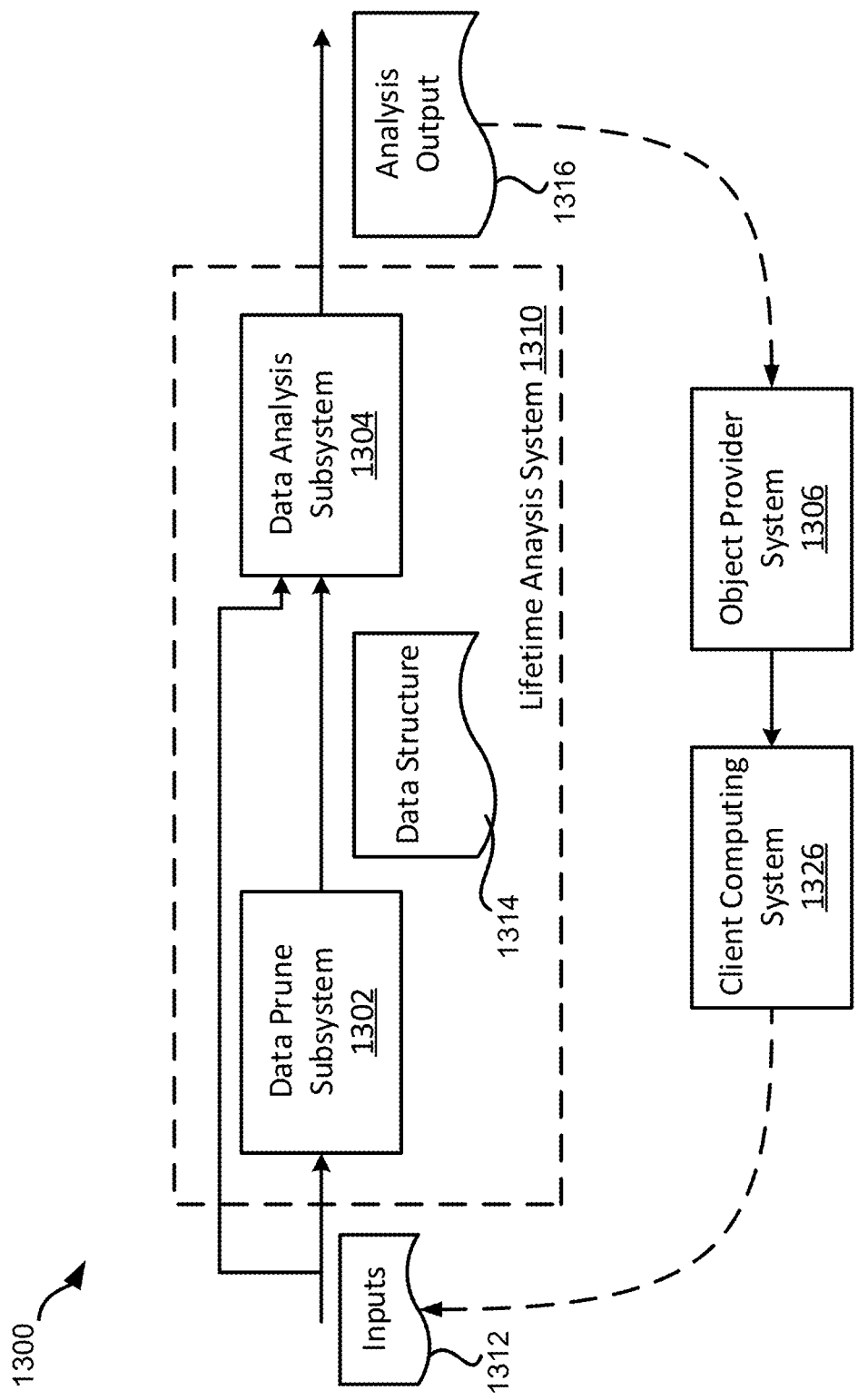
FIG. 13 is an example of a computing environment for determining values of objects to satisfy multiple objectives associated with the objects according to some aspects.

FIG. 13 shows an example of a computing environment 1300 for determining values of parameters associated with objects over their lifetime according to some aspects. The computing environment 1300 can include one or more processing devices (not shown for simplicity), which may be distributed from one another and in communication over a network (e.g., a local network or the Internet). In some examples, the computing environment 1300 includes a cloud computing environment, such as a Software as a Service (SaaS) environment, that is accessible to a client computing system 1326. The client computing system 1326 can provide inputs 1312 (e.g., constraints and various objectives) to the computing environment 1300, and more specifically to a lifetime analysis system 1310 of the computing environment 1300.

In some examples, the lifetime analysis system 1310 is configured for determining an analysis output 1316 containing values of parameters associated with various objects over their lifetimes to satisfy multiple objectives associated with the objects. Examples of the parameters can include the location of the object, the quality of the object, the resource consumption associated with acquiring a copy of the object, a time period for a combination of values of the parameters to be effective, or any combination of these. The lifetime analysis system 1310 can provide analysis output 1316 to an object provider system 1306. The object provider system 1306 can receive the analysis output 1316 from the lifetime analysis system 1310 and perform one or more operations based on the analysis output 1316. In some examples, the object provider system 1306 can provide feedback or other information to the client computing system 1326, for example, to influence future inputs 1312 from the client computing system 1326 to the lifetime analysis system 1310.

The lifetime analysis system 1300 includes a data prune subsystem 1302 and a data analysis subsystem 1304. The lifetime analysis system 1310, the data prune subsystem 1302, and the data analysis subsystem 1304 may be implemented using software (e.g., instructions or program code) executed by one or more processing devices (e.g., processors or cores), hardware, or combinations thereof, such as those described above with regard to FIGS. 1-10. The software may be stored on a non-transitory storage medium (e.g., on a memory device). The computing environment 1300 depicted in FIG. 13 is merely an example and is not intended to unduly limit the scope of claimed embodiments. One of ordinary skill in the art would recognize many possible variations, alternatives, and modifications. For example, in some implementations, the lifetime analysis system 1310 can be implemented using more or fewer systems or subsystems than those shown in FIG. 13, may combine two or more subsystems, or may have a different configuration or arrangement of the systems or subsystems.

The input 1312 may include constraints that bound potential values for a parameter associated with an object over a future timespan. For example, the input 1312 can include constraints on the parameter of the object, such as the resource consumption associated with accessing a copy of the object over the lifetime of the object. Other examples of the constraints may include (i) dates for actionable periods during which the parameter associated with the object may be changed, (ii) a maximum or minimum number of enhancement periods 1108 allowable during the future timespan, (iii) a restriction on the specific dates of the enhancement periods 1108 and the disposal period 1106, (iv)

a number of allowed changes to the values of the parameter, (v) different types of allowed changes to the values of the parameter, (vi) a maximum or minimum number of types of changes that can be applied to the parameter, or (vii) any combination thereof.

The input 1312 can also include the objectives to be satisfied when determining the values associated with the parameter. For example, objectives can include a minimum number of copies of the object to be provided to users during the future timespan, e.g., the lifetime of the object. The objectives may additionally or alternatively include maximizing the total number of copies of the object provided to users. Other objectives can also be specified in the input 1312. As can be seen from the various input, constraints, and objectives, it can be computationally taxing to determine the analysis output 1316 for the values of parameters (such as the access-resource-consumption) associated with objects.

To reduce the complexity of the analysis, the lifetime analysis system 1310 employs the data prune subsystem 1302, which reduces the analysis space. For example, the data prune subsystem 1302 can be configured to prune the candidate values for parameters associated with objects, combine actionable periods for the objects, group similar objects, or any combination thereof. An "actionable period" is a time period during which the value of a parameter associated with an object is changeable to one of the candidate values. If a time period is not an actionable period, the value of the parameter is fixed and cannot be changed. For example, an actionable period can include the dates where an enhancement period 1108 or a disposal period 1106 can be introduced so that the value of the parameter associated with the object can be changed and selected from multiple candidate values.

The data prune subsystem 1302 can utilize the various constraints included in the input 1312 to perform the pruning. For example, if a candidate value of a parameter associated with an object exceeds the allowed amount of changes to the value of the parameter, the data prune subsystem 1302 will remove the candidate value, thereby reducing the total number of candidate values. As another example, if multiple objects have similar attributes such that their parameter values will be substantially similar during a future timespan, the data prune subsystem 1302 can group these objects together and use just one of the objects as a representative object for the group. The data prune subsystem 1302 can then determine the parameter values for the representative object and apply those values to all of the objects in the group. In this way, the data prune subsystem 1302 avoids the redundancy associated with performing a substantially similar analysis on all of the objects in the group, thereby reducing unnecessary consumption of computing resources. Similarly, the number of actionable periods can also be reduced by aggregating the actionable periods, such as combining two adjacent actionable periods into one actionable period. Additional details regarding the data prune process performed by the data prune subsystem 1302 are provided below with regard to FIG. 14.

The pruned set of candidate values for the parameter (generated by the data prune subsystem 1302) are organized in a data structure 1314 (e.g., one or more tables, matrices, arrays, etc.). The data structure 1314 can include one or more value grids (e.g., price grids), with each of the value grids comprising the pruned set of candidate values assigned various dates occurring during the future timespan. The data analysis subsystem 1304 can utilize the data structure 1314 to determine the analysis output 1316.

In some examples, the data analysis subsystem 1304 employs a two-stage algorithm to determine the analysis output 1316 based on the pruned set of candidate values in the data structure 1314. At the first stage, the data analysis subsystem 1304 determines an aggressive combination of candidate values for the parameter, where the aggressive combination contains the candidate values with the lowest magnitudes among all of the candidate values in the data structure 1314. The data analysis subsystem 1304 then determines if the aggressive combination of the candidate values results in at least one objective specified in the input 1312 being satisfied, such as the minimum amount of the object being accessed by users during the object's lifetime. This enables the data analysis subsystem 1304 to determine if there is a feasible solution for the analysis without carrying out the actual steps for performing the analysis, thereby avoiding unnecessary consumption of computing resources. If the at least one objective is not satisfied by the aggressive combination of candidate values, the data analysis subsystem 1304 terminates the process and provides the aggressive combination as the analysis output 1316. If the at least one objective is satisfied by the aggressive combination of candidate values, the data analysis subsystem 1304 continues to the second stage, during which the data analysis subsystem 1304 performs further analysis based on the pruned set of candidate values in the data structure 1314. At the second stage, the data analysis subsystem 1304 apply a cutting plane algorithm to the pruned set of candidate values in the data structure 1314, in order to determine the analysis output 1316. The analysis output 1316 resulting from the second stage may include a combination of candidate values for the parameter that both (i) have higher magnitudes than the aggressive combination of candidate values and (ii) satisfy the constraints and achieves the objectives specified in the input 1312. Additional details regarding the process performed by the data analysis subsystem 1304 are provided below with respect to FIG. 15.

In some examples, the analysis output 1316 can be sent to the object provider system 1306 for implementation. For example, the object provider system 1306 can implement a schedule for one or more objects based on the analysis output 1316 by setting a value of a parameter associated with the objects over the actionable periods according to the values specified in the analysis output 1316. In addition, the object provider system 1306 can cause the objects to be deployed to various locations at certain time periods in accordance with the analysis output 1316. For example, the object provider system 1305 can cause a server to make objects available at certain dates and quantities in accordance with the analysis output 1316.

Figure 14:
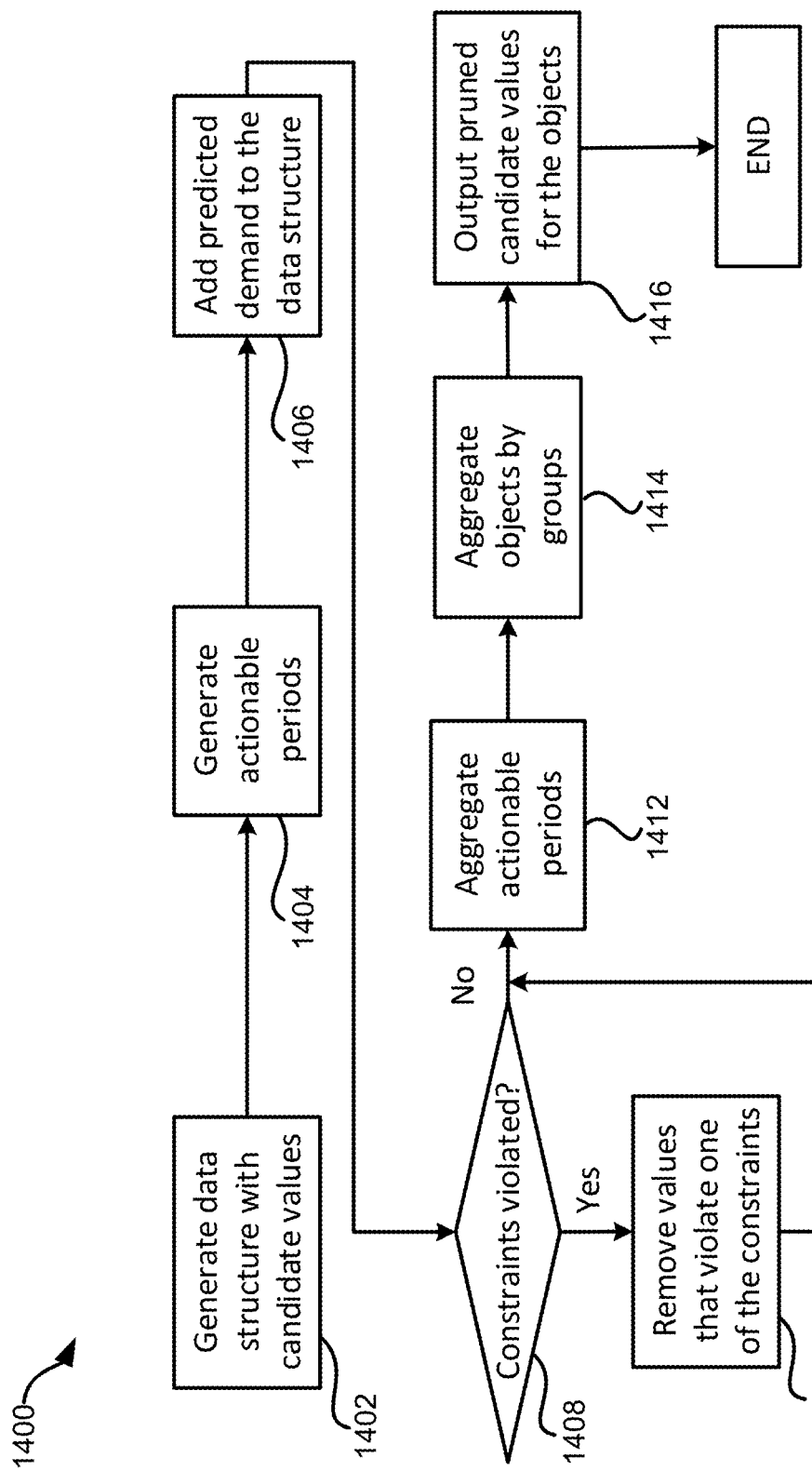
FIG. 14 is an example of a flow chart for pruning candidate values for a parameter associated with the objects according to some aspects.

FIG. 14 shows an example of a process 1400 for pruning candidate values for a parameter associated with one or more objects according to some aspects. Some examples can include more steps than, fewer steps than, different steps than, or a different order of the steps shown in FIG. 14. Some examples can be implemented using any of the systems and processes described with respect to FIGS. 1-13, such as the data prune subsystem 1302.

In block 1402, a processing device generates a data structure including a set of candidate values for a parameter associated with the objects. In some examples, the data structure can include a combination of the value grids for a disposal period 1106 and the value grids for enhancement periods 1108. An example of the combined value grids for an object is shown in Table 1 below. If there are multiple objects, multiple of the value grids can be generated for the objects.

TABLE 1

Exemplary value grids

| Time period (date) | Candidate values (as percentage reductions from original value) |
|---|---|
| 7/1 | {10%, 20%, 30%, 40%, 50%} |
| 7/2 | {10%, 20%, 30%, 40%, 50%} |
| 7/3 | none |
| 7/4 | {19%, 36%, 51%, 58%} |
| 7/5 | {19%, 36%, 51%, 58%} |
| 7/6-7/8 | none |
| 7/9 | {10%, 20%, 30%, 40%, 50%} |
| . . . | . . . |

In Table 1, the candidate values for the parameter are represented using the value reductions. An absolute value of the candidate values can also be determined and included in the value grids. In the example shown in Table 1, July 1, 2, 4, 5 and 9 can be selected as a disposal period 1106, among which July 4 and 5 can also be included in an enhancement period 1108. Other days, such as July 3 and July 6-8 are days not qualified for enhancement period 1108 nor disposal period 1106. As a result, the candidate values for July 4 and 5 are the combined value reductions for both the enhancement period 1108 and the disposal period 1106. The processing device can generate the value grids based on the input 1312, which specifies the available enhancement periods and available disposal period, and the possible value changes for the two types of periods.

In block 1404, the processing device generates actionable periods based on the generated values grids. In some examples, the processing device can determine the actionable periods based on the available enhancement periods and available disposal period specified in the input 1312 and/or the generated data structure. In other examples, the processing device determines the actionable periods according to an actionable-period generation process. In this process, the lifetime of the object is classified into demand periods, which are periods when a user can request access to a copy of the object. Some of the demand periods may also serve as actionable periods, during which the parameter value for an object is allowed to change. The processing device can determine the actionable periods by examining each demand period to determine if the demand period also qualifies as an actionable period, as described in greater detail below. The processing device can then remove demand periods that are not also actionable periods from the data structure.

In some examples, the actionable periods can be determined based on whether disposal periods 1106 are allowed in the lifetime of an object. For example, there can be N demand periods during the lifetime of the object, and each of the demand periods can be designated from $t_1$ to $t_N$. If only disposal periods 1106 are allowed during the lifetime of the object, then a particular demand period $t_x$ also qualifies as an actionable period if a disposal period 1106 is allowed during that demand period $t_x$.

In some examples, the actionable periods can also be determined based on whether enhancement periods 1108 are allowed in the lifetime of an object. For example, there can be N demand periods during the lifetime of the object, and each of the demand periods can be designated from $t_1$ to $t_N$. If only enhancement periods 1108 are allowed during the lifetime of the object, the determination is further based on whether sequential enhancement periods are enforced. Sequential enhancement periods refer to the scenarios where two or more enhancement periods 1108 are temporally adjacent to each other during the lifetime of the object. If sequential enhancement periods are enforced, then a particular demand period $t_x$ also qualifies as an actionable period if an enhancement period 1108 is allowed for that demand period $t_x$ or an adjacent demand period $t_{x-1}$. If sequential enhancement periods are not enforced, then demand period $t_x$ can also qualify as an actionable period if enhancement period eligibility is changed from an adjacent demand period $t_{x-1}$ to that demand period $t_x$.

In some examples, both disposal periods 1106 and enhancement periods 1108 are allowed in the lifetime of the object. In some such cases, the determination can be based on whether sequential enhancement periods are enforced. If sequential enhancement periods are enforced, then a particular demand period $t_x$ also qualifies as an actionable period if a disposal period 1106 is allowed during that demand period $t_x$, or if an enhancement period 1108 is allowed during that demand period $t_x$ or an adjacent demand period $t_{x-1}$. If sequential enhancement periods are not enforced, then that demand period $t_x$ qualifies as an actionable period if enhancement period eligibility is changed from an adjacent demand period $t_{x-1}$ to that demand period $t_x$, or a disposal period 1106 is allowed during that demand period $t_x$.

In block 1406, the processing device adds predicted demand to the data structure. The predicted demand is a forecast of the number of objects users will access during the lifespan of the object when the parameter associated with the object is set to a given value. In some examples, the predicted demand is determined using a demand prediction model (e.g., ARIMA, ARIMAX, ESM, etc.) in conjunction with historical data for similar objects. Alternatively, the predicted demand can be provided by the client computing system 1326. Adding the predicted demand to the data structure can facilitate the determination of whether the objectives associated with the objects are satisfied. For example, the predicted demand can be used to predict the number of objects accessed by users for a given value of the parameter of the object. This number can be compared with an objective including the minimum number of copies of the object to be provided during the future timespan to determine this this objective can be achieved by the given value, as will be described below with regard to FIG. 16.

In block 1408, the processing device determines whether any of the constraints specified in the input 1312 are violated. For example, the constraints can include minimum-maximum rules specifying the values of the parameter to be above a minimum value and below a maximum value during certain actionable periods. Additionally or alternatively, the constraints can include forced reduction rules specifying one or more forced reduction values for the parameter during certain of the actionable periods. The constraints can additionally or alternatively include fixed value rules specifying one or more fixed values for the parameter during certain of the actionable periods. The constraints can additionally or alternatively include a promotion amount usable for bounding the potential values for the parameter during the enhancement periods 1108, and/or a markdown amount usable for bounding the potential values for the parameter during the disposal period 1106. Other constraints can also be imposed. If any of these constraints are violated, the processing device can remove the candidate values from the data structure that violate the constraints. For example, if the input 1312 specifies that the value reduction should be higher than 20% and lower than 40%, then the candidate values in Table 1 that are outside this range are removed from data structure. After removing the candidate values in the data structure that violate the constraints, or if no constraints are violated, the process can continue to block 1412.

In block 1412, the processing device aggregates the actionable periods by combining adjacent actionable periods into aggregated actionable periods. In the example shown in Table 1, July 1-2 can be combined into an aggregated actionable period since those dates are adjacent to one another, and July 3-4 can be combined into an aggregated actionable period since those dates are adjacent to one another. The aggregated actionable periods can then be used in subsequent operations, such as the operations in the remaining blocks of FIG. 14 and the operations in FIG. 16, as described in greater detail below.

In block 1414, the processing device further aggregates objects into groups. For example, the processing device can associate different objects with one another if the objects that have similar attributes such that their parameter values will likely be similar during their lifespans, thereby generating groups of objects. One of the objects in each group can be selected as a representative object for the group during the process of determining the analysis output 1316. For example, multiple movies targeting the same age group of kids can be aggregated into one group, from which one of the movies can be selected to serve as the representative object for the group in the analysis. The processing device can then apply the parameter values determined for the representative object to all the other movies in the group.

Figure 16:
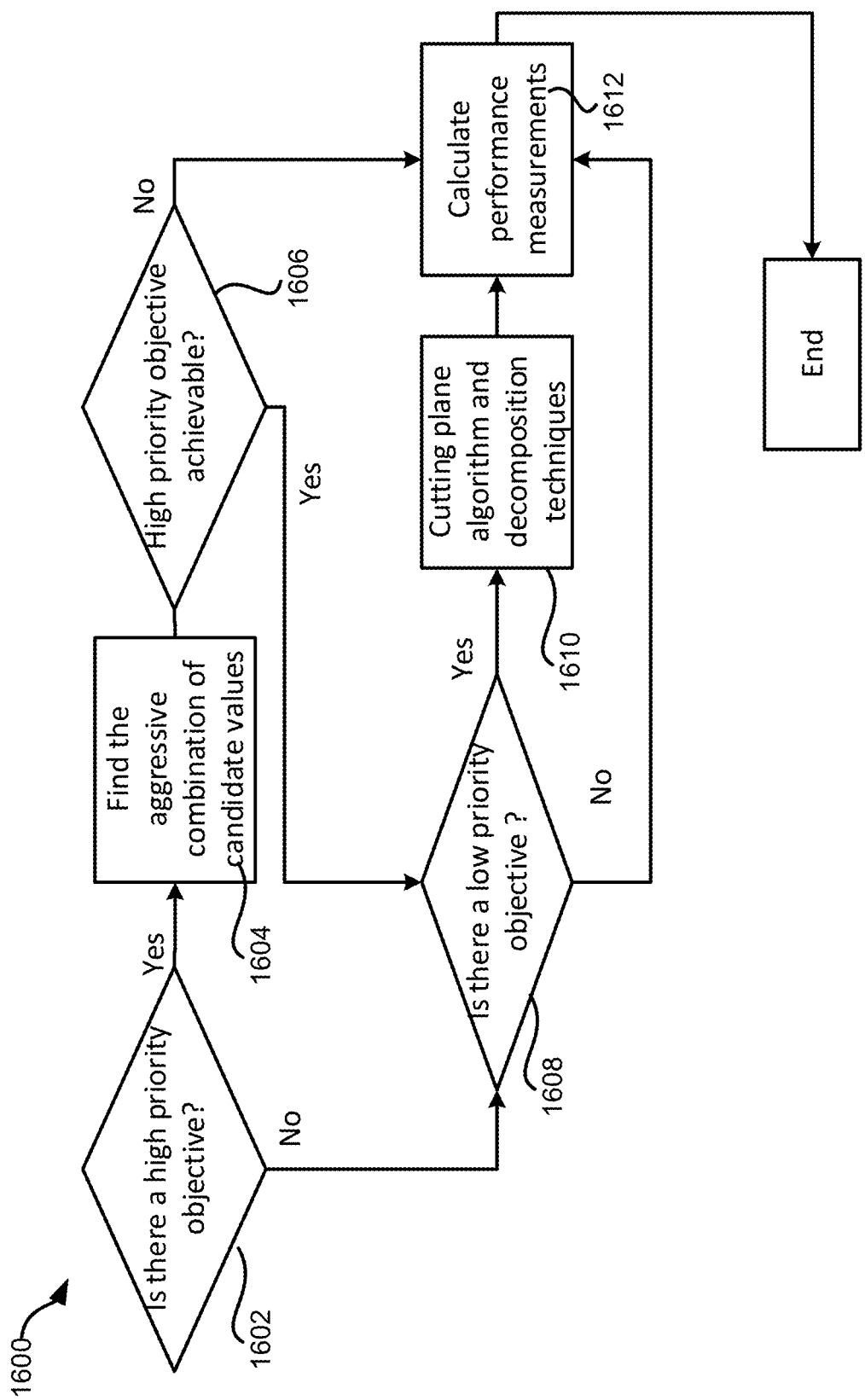
FIG. 16 is an example of a flow chart for determining a combination of values for a parameter that satisfy one or more objectives according to some aspects.

By applying the various pruning and aggregation operations described above, the number of objects, the number of actionable periods, and the number of candidate values involved in the analysis are reduced, thereby reducing the complexity of the analysis performed during a subsequent two-stage method, as discussed in greater detail with respect to FIG. 16.

In block 1416, the processing device outputs the data structure 1314, as pruned in the previous operations. An example of the pruned data structure for objects comprising digital visual content is shown in FIG. 15. The data structure shown in FIG. 15 combines the value grids of for multiple objects (e.g., multiple pieces of digital visual content). In this example, the candidate values are presented in terms of the quality of the visual contents, such as the bit-rates of the video files. The location of the objects at different actionable periods are also included in the value grids and listed as the web page where the respective digital video content is to be presented. The value grids further include the aggregated actionable periods during which the quality of the digital video content is changeable, as well as the forecasted demand for the digital video content. The information contained in the value grids can be utilized by the processing device to perform some or all of the process shown in FIG. 16.

FIG. 16 shows an example of a process 1600 for determining, from the pruned set of candidate values, a combination of values for the objects that achieve one or more objectives according to some aspects. The process 1600 includes two stages, the first stage includes blocks 1602-1606 and the second stage includes blocks 1608-1610.

In block 1602, the processing device determines if a high priority objective is to be achieved. As discussed above, the inputs 1312 may include multiple objectives associated with the objects that are to be satisfied by the analysis output 1316. Among the objectives, some are assigned a higher priority than others. For example, an objective for providing a minimum amount of copies of the objects can be assigned a higher priority than an objective for maximizing the total number of copies of objects accessed by users.

If the processing device determines that a high priority objective is to be achieved, the process 1600 proceeds to block 1604. If the higher priority objective is to provide a minimum amount of the object to users during the lifetime of the objects, the processing device determines, in block 1604, an aggressive combination of candidate values for the parameter associated with the object. The aggressive combination is a subset of the candidate values having the lowest magnitudes in the data structure 1314. As discussed above, a lower value for the parameter associated with objects can lead to a higher number of copies of the objects being accessed by users. So, by including the lowest parameter values in the combination of candidate values, the number of copies of the objects provided to the users can be maximized. This constitutes an aggressive combination of candidate values for the high priority objective. While determining the aggressive combination of candidate values, other objectives and constraints are not considered in some examples.

In block 1606, the processing device determines if the high priority objective is satisfied using the aggressive combination of candidate values. In the above example, if the number of copies of the objects provided to the users using the aggressive combination of candidate values is higher than the minimum amount specified in the high priority objective, the objective is satisfied. Otherwise, the high priority objective is not satisfied.

If the processing device determines that the high priority objective is not satisfied, the process 1600 proceeds to block 1612, where the processing device outputs the aggressive combination of the candidate values as the as the analysis output 1316, since it is the best possible output. The processing device further calculates performance measurements (e.g., profit, revenue, and sell out percentage) associated with the aggressive combination of the candidate values.

If the processing device determines that the high priority objective is satisfied, the process 600 proceeds to block 1608, where the processing device determines if there is a low priority objective to be satisfied. If there are no more objectives, the process 1600 proceeds to block 1612, where the processing device calculates the performance measurements and outputs the aggressive combination of the candidate values as the analysis output 1316.

If there is a low priority objective to be satisfied, such as a return objective for maximizing the return benefit associated with users accessing the objects or maximizing the total number of accessed copies of objects, the process 1600 continues to block 1610.

In block 1610, the processing device employs a cutting-plane algorithm and decomposition techniques to determine the analysis output 1316. Specifically, the processing device employs a two-phase method to determine the analysis output 1316. In the first phase, the processing device relaxes the analysis by removing some of the constraints. In one example, the constraints that involve high computational complexity are removed, such as constraints concerning the time periods of the lifetime. The processing device then employs a decomposition method (e.g., the Dantzig Wolfe decomposition method) to perform the relaxed analysis to determine a solution. The processing device examines the solution to determine if any of the removed constraints are violated. If not, the processing device outputs the solution as the analysis output 1316 and the process 1600 terminates.

If the processing device determines that the solution violated the removed constraints, the processing device determines that the solution is an infeasible solution and starts the second phase of the method. In the second phase, the processing device generates a feasible solution for the original analysis based on the infeasible solution generated in the first phase. This feasible solution provides a lower bound for the value of the low priority objective involving a maximization, such as maximizing the total number of copies of the objects accessed by users. Similarly, the infeasible solution determined in the first phase of the method provides an upper bound for the value of the low priority objective. In one example, the processing device utilizes the lower bound and the upper bound to generate and add cuts to the original analysis. The cuts can be generated as constraints and added to the original analysis. The added cuts help to further reduce the analysis space.

From the feasible solution, the processing device solves the modified analysis to generate an analysis output 1316. In some examples, the processing device uses the branch and cut algorithm to generate the analysis output 1316. The analysis output 1316 contains a combination of values for the parameter at different time points of the object's lifetime. After the analysis output 1316 is found, the process 1600 proceeds to block 1612 to calculate performance measurements as described above.

FIG. 17 shows an example of an analysis output 1316 that includes a combination of values of the parameter associated with one or more objects at different time periods of their lifetimes according to some aspects. In this example, the objects contain multiple types of visual content. Because similar objects are aggregated together into groups by the data prune subsystem 1307, individual types of visual content are grouped together and represented by their groups, such as the animation kids only, drama, action, Si-Fi, etc. Alternatively, a representative object for each value groups can be included in the analysis output 1316. All the objects in the same group as the representative object would then have the same analysis output 1316. In this example, the parameter value for a piece of visual content is the quality of the visual content, because higher-quality visual content requires more network resource consumption than lower-quality visual content.

The combination of values for the parameter shown in FIG. 17 includes the quality of the objects over different actionable periods and the respective locations (the web pages in this example). For example, the analysis output 1316 suggests that visual content in the "animation kids only" group should be presented at web page 1 and offered for downloading in high definition (HD) quality from April 1 to May 25; in ultra-high definition (UHD), HD, and standard definition (SD) quality from May 25 to June 30; and in UHD and HD quality from July 1 to August 31. In some examples, the processing device generates a graphical user interface depicting an assignment of the combination of candidate values to the various dates or time periods occurring during the lifetime of the objects. The processing device further stores the combination of candidate values in a data store prior to transmitting it to a remote computing device, such as the object provider system 1306. Based on the analysis output 1316, the object provider system 1306 can generate a schedule to cause the visual content streaming website to automatically generate and/or provide the different-quality versions of the visual content on the proper dates.

While the above description focuses on the digital objects (e.g., digital visual content), the techniques provided herein can also be applied to parameters associated with physical objects, such as electronic devices, clothing, toys, and so on. Additionally, while the above examples focus on the bit-rate or quality of the digital objects, other examples can involve other parameters associated with objects. For instance, in other examples the parameter can be the price of the object. Similarly, while the above examples focus on website locations, in other examples the locations of the objects can include other digital or physical locations (e.g., stores) for accessing (e.g., purchasing) the objects.

In some examples, the enhancement period 1108 can include a promotion period for the objects; the disposal period 1106 can include a markdown period for the objects; and the constraints can include the maximum and minimum prices of the objects for a given period, a forced sale price for the objects, etc. The objectives can include minimizing the inventory of the objects and maximizing the profit or revenue. The determined analysis output 1316 can specify the prices for the objects at different periods and the stores at which the objects should be provided for sale at the determined prices.

The principles described herein can be applied in other contexts as well. For example, the objects may include cloud computing resources. In some such examples, the parameter associated with the objects can include an amount of cryptocurrency required to access the object, or an amount of computation that needs to be performed in exchange for using the cloud computing resources. The techniques proposed here can be utilized to determine the parameter values associated with the cloud computing resources at different time periods, such as the peak hours or off-peak hours to achieve objectives such as maximizing the profit and the usage of the cloud computing resources. The techniques provided herein can also be applied to other types of applications.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
a processing device; and
a memory device comprising instructions that are executable by the processing device for causing the processing device to:
receive input data comprising (i) a plurality of constraints on a parameter associated with an object over a future timespan, and (ii) a minimum amount of the object to be provided to users during the future timespan;
generate a data structure based on the plurality of constraints, the data structure comprising candidate values for the parameter that comply with the plurality of constraints assigned to a plurality of dates occurring during the future timespan;
determine a plurality of actionable periods occurring within the future timespan, the plurality of actionable periods being time periods during which a value of the parameter is set to one of the candidate values in the data structure to comply with the plurality of constraints;
generate aggregated actionable periods by combining together pairs of actionable periods from among the plurality of actionable periods that span adjacent date ranges in the future timespan;
determine that a first combination of candidate values associated with the aggregated actionable periods results in the minimum amount of the object being provided to the users during the future timespan, the first combination of candidate values comprising a first subset of the candidate values having lowest magnitudes during the aggregated actionable periods;
in response to determining that the first combination of candidate values results in the minimum amount of the object being provided to the users during the future timespan, determine a second combination of candidate values associated with the aggregated actionable periods, the second combination of candidate values being determined by applying a cutting-plane algorithm in which constraints are iteratively added to a relaxed problem to identify the second combination of candidate values, wherein the second combination of candidate values satisfies a return objective and comprises a second subset of the candidate values with higher magnitudes than the first combination of candidate values; and
cause the second combination of candidate values to be transmitted to a remote computing device, wherein the second combination of values are usable by the remote computing device to implement a value schedule for the object.

2. The system of claim 1, wherein determining the second combination of candidate values comprises:
applying a Dantzig Wolfe decomposition method to the relaxed problem to determine whether a solution to the relaxed problem is a feasible solution or an infeasible solution; and
based on determining that the solution is infeasible:
generating a feasible solution based on the infeasible solution; and
applying the cutting-plane algorithm to the relaxed problem starting from the feasible solution, to identify the second combination of candidate values.

3. The system of claim 1, wherein the object is a first object and the memory device further comprises instructions that are executable by the processing device for causing the processing device to:
associate a second object with the first object based on the second object being part of a value group also containing the first object; and
based on the association between the second object and the first object, also assign the second combination of candidate values to the second object during the future timespan.

4. The system of claim 1, wherein generating the data structure based on the plurality of constraints comprises:
generating a set of potential values for the parameter during the future timespan;
generate a reduced set of potential values by removing a subset of the potential values that are below a minimum value or above a maximum value for the parameter during certain of the actionable periods specified in minimum-maximum rules; and
incorporating the reduced set of potential values into the data structure as the candidate values.

5. The system of claim 1, wherein generating the data structure based on the plurality of constraints comprises:
generating a set of potential values for the parameter during the future timespan;
generating a reduced set of potential values by removing a subset of the potential values that do not comply with a forced reduction value for the parameter during certain of the actionable periods specified in forced reduction rules; and
incorporating the reduced set of potential values into the data structure as the candidate values.

6. The system of claim 1, wherein generating the data structure based on the plurality of constraints comprises:
generating a set of potential values for the parameter during the future timespan;
generating a reduced set of potential values by removing a subset of the potential values that do not comply with a fixed value for the parameter during certain of the actionable periods specified in fixed value rules; and
incorporating the reduced set of potential values into the data structure as the candidate values.

7. The system of claim 1, wherein the object is software or multimedia content.

8. The system of claim 1, wherein:
the plurality of constraints includes a promotion amount; or
the plurality of constraints includes a markdown amount.

9. The system of claim 1, wherein the memory device further comprises instructions that are executable by the processing device for causing the processing device to store the second combination of candidate values in a datastore prior to transmitting the second combination of candidate values to the remote computing device.

10. The system of claim 1, wherein the memory device further comprises instructions that are executable by the processing device for causing the processing device to generate a graphical user interface depicting an assignment of the second combination of candidate values to the plurality of dates occurring during the future timespan.

11. A non-transitory computer-readable medium comprising instructions that are executable by a processing device for causing the processing device to:
- receive input data comprising (i) a plurality of constraints on a parameter associated with an object over a future timespan, and (ii) a minimum amount of the object to be provided to users during the future timespan;
- generate a data structure based on the plurality of constraints, the data structure comprising candidate values for the parameter that comply with the plurality of constraints assigned to a plurality of dates occurring during the future timespan;
- determine a plurality of actionable periods occurring within the future timespan, the plurality of actionable periods being time periods during which a value of the parameter is set to one of the candidate values in the data structure to comply with the plurality of constraints;
- generate aggregated actionable periods by combining together pairs of actionable periods from among the plurality of actionable periods that span adjacent date ranges in the future timespan;
- determine that a first combination of candidate values associated with the aggregated actionable periods results in the minimum amount of the object being provided to the users during the future timespan, the first combination of candidate values comprising a first subset of the candidate values having lowest magnitudes during the aggregated actionable periods;
- in response to determining that the first combination of candidate values results in the minimum amount of the object being provided to the users during the future timespan, determine a second combination of candidate values associated with the aggregated actionable periods, the second combination of candidate values being determined by applying a cutting-plane algorithm in which constraints are iteratively added to a relaxed problem to identify the second combination of candidate values, wherein the second combination of candidate values satisfies a return objective and comprises a second subset of the candidate values with higher magnitudes than the first combination of candidate values; and
- cause the second combination of candidate values to be transmitted to a remote computing device, wherein the second combination of values are usable by the remote computing device to implement a value schedule for the object.

12. The non-transitory computer-readable medium of claim 11, wherein determining the second combination of candidate values comprises:
- applying a Dantzig Wolfe decomposition method to the relaxed problem to determine whether a solution to the relaxed problem is a feasible solution or an infeasible solution; and
- based on determining that the solution is infeasible:
  - generating a feasible solution based on the infeasible solution; and
  - applying the cutting-plane algorithm to the relaxed problem starting from the feasible solution, to identify the second combination of candidate values.

13. The non-transitory computer-readable medium of claim 11, wherein the object is a first object, and further comprising instructions that are executable by the processing device for causing the processing device to:
- associate a second object with the first object based on the second object being part of a value group also containing the first object; and
- based on the association between the second object and the first object, also assign the second combination of candidate values to the second object during the future timespan.

14. The non-transitory computer-readable medium of claim 11, wherein generating the data structure based on the plurality of constraints comprises:
- generating a set of potential values for the parameter during the future timespan;
- generate a reduced set of potential values by removing a subset of the potential values that are below a minimum value or above a maximum value for the parameter during certain of the actionable periods specified in minimum-maximum rules; and
- incorporating the reduced set of potential values into the data structure as the candidate values.

15. The non-transitory computer-readable medium of claim 11, wherein generating the data structure based on the plurality of constraints comprises:
- generating a set of potential values for the parameter during the future timespan;
- generating a reduced set of potential values by removing a subset of the potential values that do not comply with a forced reduction value for the parameter during certain of the actionable periods specified in forced reduction rules; and
- incorporating the reduced set of potential values into the data structure as the candidate values.

16. The non-transitory computer-readable medium of claim 11, wherein generating the data structure based on the plurality of constraints comprises:
- generating a set of potential values for the parameter during the future timespan;
- generating a reduced set of potential values by removing a subset of the potential values that do not comply with a fixed value for the parameter during certain of the actionable periods specified in fixed value rules; and
- incorporating the reduced set of potential values into the data structure as the candidate values.

17. The non-transitory computer-readable medium of claim 11, wherein:
- the plurality of constraints includes a promotion amount; or
- the plurality of constraints includes a markdown amount.

18. The non-transitory computer-readable medium of claim 11, further comprising instructions that are executable by a processing device for causing the processing device to generate a graphical user interface depicting an assignment of the second combination of candidate values to the plurality of dates occurring during the future timespan.

19. A computer-implemented method comprising:
- receiving input data comprising (i) a plurality of constraints on a parameter associated with an object over a future timespan, and (ii) a minimum amount of the object to be provided to users during the future timespan;
- generating a data structure based on the plurality of constraints, the data structure comprising candidate values for the parameter that comply with the plurality of constraints assigned to a plurality of dates occurring during the future timespan;
- determining a plurality of actionable periods occurring within the future timespan, the plurality of actionable periods being time periods during which a value of the parameter is set to one of the candidate values in the data structure to comply with the plurality of constraints;

generating aggregated actionable periods by combining together pairs of actionable periods from among the plurality of actionable periods that span adjacent date ranges in the future timespan;

determining that a first combination of candidate values associated with the aggregated actionable periods results in the minimum amount of the object being provided to the users during the future timespan, the first combination of candidate values comprising a first subset of the candidate values having lowest magnitudes during the aggregated actionable periods;

in response to determining that the first combination of candidate values results in the minimum amount of the object being provided to the users during the future timespan, determining a second combination of candidate values associated with the aggregated actionable periods, the second combination of candidate values being determined by applying a cutting-plane algorithm in which constraints are iteratively added to a relaxed problem to identify the second combination of candidate values, wherein the second combination of candidate values satisfies a return objective and comprises a second subset of the candidate values with higher magnitudes than the first combination of candidate values; and causing the second combination of candidate values to be transmitted to a remote computing device, wherein the second combination of values are usable by the remote computing device to implement a value schedule for the object.

20. The method of claim 19, wherein determining the second combination of candidate values comprises:

applying a Dantzig Wolfe decomposition method to the relaxed problem to determine whether a solution to the relaxed problem is a feasible solution or an infeasible solution; and based on determining that the solution is infeasible:
generating a feasible solution based on the infeasible solution; and
applying the cutting-plane algorithm to the relaxed problem starting from the feasible solution, to identify the second combination of candidate values.

21. The method of claim 19, wherein the object is a first object and the method further comprising:

associating a second object with the first object based on the second object being part of a value group also containing the first object; and based on the association between the second object and the first object, also assigning the second combination of candidate values to the second object during the future timespan.

22. The method of claim 19, wherein generating the data structure based on the plurality of constraints comprises:

generating a set of potential values for the parameter during the future timespan;

generate a reduced set of potential values by removing a subset of the potential values that are below a minimum value or above a maximum value for the parameter during certain of the actionable periods specified in minimum-maximum rules; and incorporating the reduced set of potential values into the data structure as the candidate values.

23. The method of claim 19, wherein generating the data structure based on the plurality of constraints comprises:

generating a set of potential values for the parameter during the future timespan;

generating a reduced set of potential values by removing a subset of the potential values that do not comply with a forced reduction value for the parameter during certain of the actionable periods specified in forced reduction rules; and incorporating the reduced set of potential values into the data structure as the candidate values.

24. The method of claim 19, wherein generating the data structure based on the plurality of constraints comprises:

generating a set of potential values for the parameter during the future timespan;

generating a reduced set of potential values by removing a subset of the potential values that do not comply with a fixed value for the parameter during certain of the actionable periods specified in fixed value rules; and incorporating the reduced set of potential values into the data structure as the candidate values.

25. The method of claim 19, wherein the object is software or multimedia content.

26. The method of claim 19, wherein:

the plurality of constraints includes a promotion amount; or the plurality of constraints includes a markdown amount.

27. The method of claim 19, further comprising generating a graphical user interface depicting an assignment of the second combination of candidate values to the plurality of dates occurring during the future timespan.

* * * * *